(12) United States Patent
Yamasaki et al.

(10) Patent No.: US 10,682,804 B2
(45) Date of Patent: Jun. 16, 2020

(54) MOLDING METHOD AND MOLDING APPARATUS FOR RESIN MOLDED ARTICLE

(71) Applicant: Kyoraku Co., Ltd., Kyoto-Shi, Kyoto (JP)

(72) Inventors: Yoshihiro Yamasaki, Yamato (JP); Yuki Harasawa, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 336 days.

(21) Appl. No.: 15/545,296

(22) PCT Filed: Jan. 22, 2016

(86) PCT No.: PCT/JP2016/051849
§ 371 (c)(1),
(2) Date: Jul. 20, 2017

(87) PCT Pub. No.: WO2016/117682
PCT Pub. Date: Jul. 28, 2016

(65) Prior Publication Data
US 2018/0001543 A1 Jan. 4, 2018

(30) Foreign Application Priority Data

Jan. 24, 2015 (JP) ................................ 2015-011874

(51) Int. Cl.
*B29C 55/20* (2006.01)
*B29C 48/00* (2019.01)
(Continued)

(52) U.S. Cl.
CPC .......... *B29C 55/20* (2013.01); *B29C 48/0017* (2019.02); *B29C 48/0018* (2019.02);
(Continued)

(58) Field of Classification Search
None
See application file for complete search history.

(56) References Cited

U.S. PATENT DOCUMENTS

| 8,609,015 B2 | 12/2013 | Sumi et al. |
| 2012/0060960 A1* | 3/2012 | Sumi ...................... B29C 51/02 |
| | | 138/141 |

FOREIGN PATENT DOCUMENTS

| JP | H05-42584 A | 2/1993 |
| JP | H07-60845 A | 3/1995 |

(Continued)

OTHER PUBLICATIONS

International Search Report dated Apr. 12, 2016 during the prosecution of PCT/JP2016/051849.
(Continued)

*Primary Examiner* — Monica A Huson
(74) *Attorney, Agent, or Firm* — Maier & Maier, PLLC

(57) ABSTRACT

A molding method for a resin molded article includes: a step of sandwiching a sheet-shaped resin in a molten state extruded downward by a pair of rollers, and sending out downward the sheet-shaped resin in the molten state by a rotational driving of the rollers so as to allow a first stretching; a step of drawing downward the sheet-shaped resin in the molten state sent out downward so as to allow a second stretching; a step of disposing the sheet-shaped resin in the molten state that is drawn in a side portion of a mold disposed below the pair of rollers; and a step of molding the sheet-shaped resin into a shape conforming to a mold shape by depressurizing a sealed space formed between the sheet-shaped resin in the molten state and the mold and/or pressurizing the sheet-shaped resin toward the mold.

13 Claims, 20 Drawing Sheets

(51) Int. Cl.
 | | |
 |---|---|
 | *B29C 49/04* | (2006.01) |
 | *B29C 51/04* | (2006.01) |
 | *B29C 51/10* | (2006.01) |
 | *B29C 49/00* | (2006.01) |
 | *B29C 51/02* | (2006.01) |
 | *B29C 55/06* | (2006.01) |
 | *B29K 101/12* | (2006.01) |

(52) U.S. Cl.
 CPC .......... *B29C 49/0047* (2013.01); *B29C 49/04* (2013.01); *B29C 51/02* (2013.01); *B29C 51/04* (2013.01); *B29C 51/10* (2013.01); *B29C 55/06* (2013.01); *B29C 2049/0057* (2013.01); *B29K 2101/12* (2013.01)

(56) References Cited

FOREIGN PATENT DOCUMENTS

| | | |
|---|---|---|
| JP | H11-005248 A | 1/1999 |
| JP | 2011-51224 A | 3/2011 |
| JP | 4902789 B2 | 3/2012 |
| JP | 2013-28030 A | 2/2013 |

OTHER PUBLICATIONS

Extended European Search Report issued for corresponding Application No. 16740289.0 dated Jun. 8, 2018.

\* cited by examiner

FIG.1
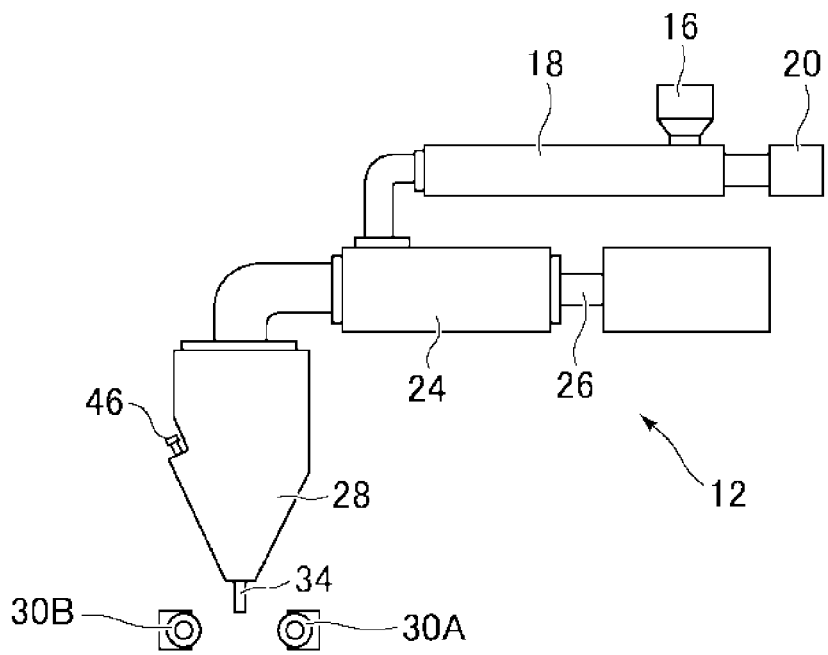
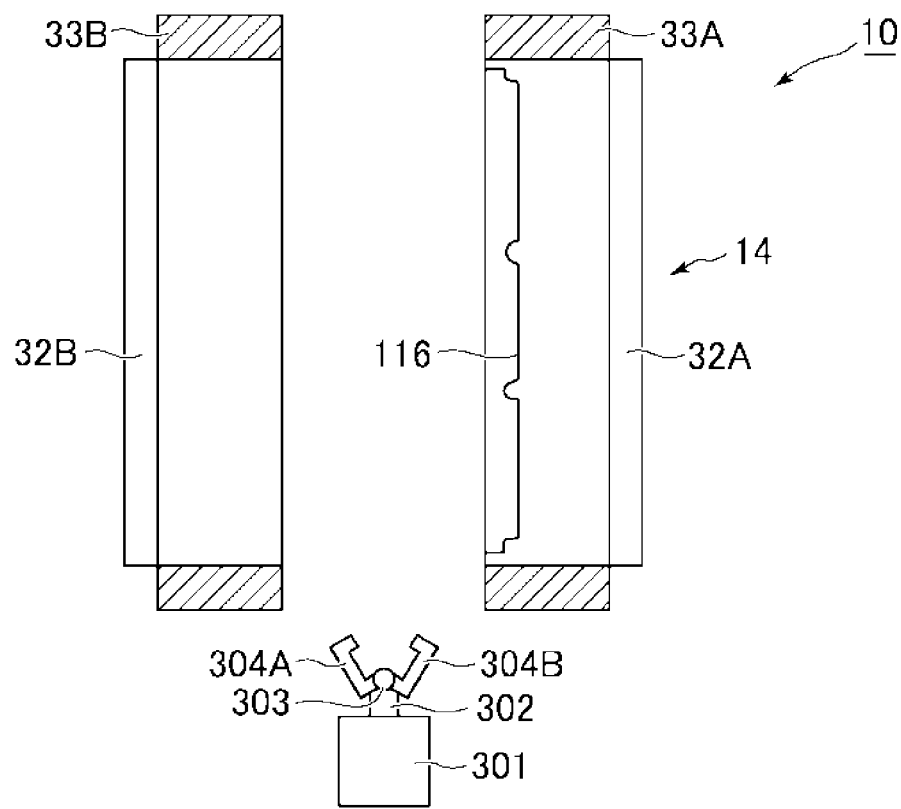

MOLDING METHOD AND MOLDING APPARATUS FOR RESIN MOLDED ARTICLE

CROSS-REFERENCE TO RELATED APPLICATIONS

This is a U.S. national phase application under 35 U.S.C. § 371 of International Patent Application No. PCT/JP2016/051849, filed on Jan. 22, 2016, and claims benefit of priority to Japanese Patent Application No. 2015-011874, filed Jan. 24, 2015. The entire contents of these applications are hereby incorporated by reference.

TECHNICAL FIELD

The present invention relates to a molding method and a molding apparatus for a resin molded article. More specifically, the present invention relates to a molding method and a molding apparatus for a resin molded article that use a thermoplastic resin that is extruded downward in a drooping form by a primary molding and molded by a secondary molding.

BACKGROUND

Conventionally, a molding method that combines a primary molding by extruding and a secondary molding by blowing (or vacuuming) has been used for manufacturing, for example, a sandwich panel made of resin.

With such molding method, a blow (or vacuum) molding is performed directly using an extruded resin in a molten state. This ensures molding the sandwich panel without posing a technical problem, such as a non-uniformity of heating, caused by reheating a resin that is once molded.

Especially, performing the blow (or vacuum) molding after causing the extruded resin in the molten state to directly droop downward and mold-clamping the resin extending in a vertical direction ensures sending out the resin from an extrusion die in an untouched state without requiring a support of the resin in the molten state until the mold clamping in the secondary molding compared with a case where, for example, the resin is extruded in a lateral direction.

However, in these preceding molding techniques, the extruded resin in the molten state directly droops downward before the secondary molding. In view of this, a draw-down or a neck-in that is generated in a sheet in a molten state poses a technical problem that is a thickness of the sheet before molding by a mold becomes non-uniform in an extruding direction or a width direction of the sheet. Hence, the applicant proposes a novel molding technique as follows in Japanese Patent No. 4902789. Here, the draw-down is a phenomenon in which the sheet in the molten state is stretched by the sheet's own weight with a lapse of time and the upper the portion of the sheet, the thinner it gets. The neck-in is a phenomenon in which the sheet contracts in the width direction and a sheet width decreases due to the draw-down.

That is, this molding method for a resin molded article includes a step of extruding a thermoplastic resin downward into a sheet shape in a molten state so as to droop downward, a step of sandwiching the sheet-shaped resin in the molten state excluded downward by a pair of rollers and sending out the sheet-shaped resin downward by a rotational driving of the rollers, a step of disposing the sheet-shaped resin in the molten state sent out downward in a side portion of a mold disposed below the pair of rollers, and a step of molding the sheet-shaped resin into a shape conforming to a mold shape by depressurizing a sealed space formed between the sheet-shaped resin in the molten state and the mold and/or pressurizing the sheet-shaped resin toward the mold. Especially, the pair of rollers are brought relatively close to one another after a lowest portion of the sheet-shaped resin in the molten state extruded downward passes between the pair of rollers. With this, the pair of rollers sandwich the sheet-shaped resin and the rotational drive of the roller sends out the sheet-shaped resin downward at a speed equal to or more than a predetermined extrusion speed.

With such molding method for the resin molded article, as the sheet-shaped resin is sent out downward by the pair of rollers, a length of the sheet-shaped resin drooping in the vertical direction becomes long. Due to this, the upper the portion of the drooping sheet-shaped resin, the thinner it gets by the sheet-shaped resin's own weight (the draw-down or the neck-in). On the other hand, adjusting a rotation speed of the roller so as to make a sending out speed by the pair of rollers become equal to or more than the extrusion speed causes the sheet-shaped resin to be pulled downward by the pair of rollers, thus the sheet-shaped resin is stretched and thinned.

At this time, the rotation speed of the rollers is decreased with a lapse of time and the sending out speed is adjusted so as to come close to the extrusion speed of the sheet made of the thermoplastic resin. In view of this, the upper the portion of the sheet-shaped resin, the more the downward tensile force by the pair of rollers decreases. Hence, stretching and thinning in association with such tensile force is relatively reduced and thinning in association with the draw-down or the neck-in is cancelled out, thereby effectively preventing the draw-down or the neck-in. As a result, a uniform thickness can be formed in the extruding direction.

Next, the sheet-shaped resin formed so as to have the uniform thickness in the extruding direction is disposed in the side portion of the mold disposed below the pair of rollers. Depressurizing the sealed space formed between the sheet-shaped resin and the mold and/or pressurizing the sheet-shaped resin toward the mold molds the sheet-shaped resin into the shape conforming to the mold shape. This ensures molding a resin molded article having a desired thickness in the extruding direction without adversely affecting a forming in the secondary molding.

However, in this molding method, the applicant has found points that cause new technical problems described below that are caused by adjusting the thickness of the sheet-shaped resin in the molten state exclusively by the pair of rollers.

First, suppose that the thinning of the resin sheet in the molten state is performed only by sending out the resin sheet in the molten state by the pair of rollers. In this case, a progress of sending out and a restraining of the draw-down generated by the resin sheet's own weight by the adjustment of the rotation speed of the pair of rollers, that is, the sending out speed, have limitations. The resin sheet sent out from the pair of rollers is no longer adjusted afterwards, and can only be thinned in a range considering that the resin sheet is pulled and stretched by its own weight. That is, depending on a length (weight) of the resin sheet in the molten state that droops from the pair of rollers, a tear of the resin sheet in the molten state possibly occurs. In view of this, the thickness of the resin sheet had to be determined in a range considering the draw-down. Furthermore, in order to thin the sheet-shaped resin in the molten state, accelerating the rotation speed of the pair of rollers to increase the sending out speed of the sheet-shaped resin can restrain the draw-down along the sending out direction of the sheet-shaped resin, however, the neck-in is generated in the width direction that is a direction perpendicular to the sending out direction of the sheet-shaped resin. In view of this, achieving further thinning becomes difficult or the secondary molding is adversely affected.

Second, the sheet-shaped resin in the molten state continuously sent out by the pair of rollers contacting the rollers at a normal temperature cools down a surface of the sheet-shaped resin and formability in the secondary molding is adversely affected. More specifically, the sheet-shaped resin is sent out by the rotational driving of the rollers through a line contact between the sheet surface of the sheet-shaped resin in the molten state and outer peripheral surfaces of the pair of rollers. At this time, the sheet surface of the sheet-shaped resin in the molten state is cooled down during a period of this line contact. This becomes an obstructive factor against the forming by the mold in the secondary molding. Even though, increasing the rotation speed of the rollers to shorten the period of the line contact generates the neck-in like the first one, or depending on the pressing force of the rollers to the sheet-shaped resin, an excessive slippage is generated between the rollers and the sheet-shaped resin. In view of this, a failure possibly occurs in a smooth sending out of the sheet-shaped resin.

In this respect, Japanese Unexamined Patent Application Publication No. H11-005248A discloses a technique that draws the lowest portion of the sheet-shaped resin in the molten state while the sheet-shaped resin in the molten state is sent out by the pair of rollers.

More specifically, the following points are disclosed. One sheet is extruded from each of at least two dies coupled to the extrusion molding machine. Immediately after this, each of the sheets is sandwiched by a pair of sandwiching rollers. At least a surface of each of the sheets is heated, creases are smoothed out, and the surface is made glossy. These at least two sheets that are made glossy are drawn and supplied within a blow molding mold. The blow molding mold is closed and the two sheets are bonded together, and then the blow molding is performed.

More specifically, controlling the drawing speed of the sheet or adjusting the number of rotations of a screw of the extrusion molding machine corresponding to the draw-down in each of the sheets approximately simultaneously supplies both the sheets, which are made glossy, within the molding mold.

Japanese Unexamined Patent Application Publication No. H11-005248A discloses controlling the drawing speed of the sheet or adjusting the number of rotations of the screw of the extrusion molding machine corresponding to the draw-down in each of the sheets. However, this does not restrain or solve the generation of the draw-down of each of the sheets. This is merely supplying both the sheets approximately simultaneously within the molding mold by controlling the drawing speed of the sheet or adjusting the number of rotations of the screw of the extrusion molding machine based on an assumption that the draw-down is generated in both the sheets.

As described above, in Japanese Patent No. 4902789, the thickness adjustment of the sheet-shaped resin in the molten state is performed exclusively by the pair of rollers. In contrast to this, in Japanese Unexamined Patent Application Publication No. H11-005248A, the pair of rollers and the clamp are used in combination to perform the sending out of the sheet-shaped resin in the molten state by the pair of rollers and the drawing of the sheet-shaped resin in the molten state by the clamp. However, the pair of rollers make the sheet surface mirrored or glossy instead of adjusting the thickness of the sheet-shaped resin in the molten state. On the other hand, in the drawing of the sheet, both the sheets, which are made glossy, are merely supplied approximately simultaneously within the molding mold. Both are not involved in the thickness adjustment of the sheet-shaped resin in the molten state.

In this respect, as a resin used for the sheet, employing one that has a relatively large MFR value or melt tension value can prevent such draw-down or neck-in to some extent. However, this leads to a limitation of materials that can be employed, thus not being practical. Especially, when a thin walled sheet is molded, there is a case where the restriction of the MFR value cannot cope because the MFR value is preferred to be large.

SUMMARY

An object of the present invention is, in view of the above-described technical problems, to provide a molding method and a molding apparatus for a resin molded article that ensures thinning and securing a satisfactory formability without imposing a limitation over a kind of a resin to be employed.

A molding method for a resin molded article according to the present invention to achieve the object includes: a step of extruding a thermoplastic resin at a predetermined extrusion speed so as to droop downward into a sheet-shape in a molten state; a step of sandwiching a sheet-shaped resin in a molten state extruded downward by a pair of rollers, and sending out downward the sheet-shaped resin in the molten state by a rotational driving of the rollers so as to allow a first stretching; a step of drawing downward the sheet-shaped resin in the molten state sent out downward so as to allow a second stretching; a step of disposing the sheet-shaped resin in the molten state that is drawn in a side portion of a mold disposed below the pair of rollers; and a step of molding the sheet-shaped resin into a shape conforming to a mold shape by depressurizing a sealed space formed between the sheet-shaped resin in the molten state and the mold and/or pressurizing the sheet-shaped resin toward the mold.

In addition, preferably, the step of sending out downward is a step of sending out downward the sheet-shaped resin in the molten state by the rotational driving of the rollers at a sending out speed equal to or more than the predetermined extrusion speed, and the step of drawing downward is a step of drawing the sheet-shaped resin in the molten state sent out downward at a drawing speed equal to or more than the sending out speed.

Moreover, a relationship between a speed difference between the drawing speed and the sending out speed and a speed difference between the sending out speed and the predetermined extrusion speed are preferably set such that an amount of thinning of the sheet-shaped resin in the molten state by the first stretching becomes larger than an amount of thinning of the sheet-shaped resin in the molten state by the second stretching in an amount of thinning of the sheet-shaped resin in the molten state that is constituted by a difference between a thickness of the sheet-shaped resin in the molten state at the step of extruding and a thickness of the sheet-shaped resin in the molten state at the step of disposing in the side portion of the mold.

Furthermore, the speed difference between the drawing speed and the sending out speed is preferably set to equal to or less than the speed difference between the sending out speed and the predetermined extrusion speed.

Additionally, the step of sending out preferably includes a step of sandwiching the sheet-shaped resin by the pair of rollers, and sending out downward by the rotational driving of the rollers at a sending out speed equal to or more than the predetermined extrusion speed by relatively bringing the pair of rollers close to one another after a lowest portion of the sheet-shaped resin in the molten state extruded downward passes between the pair of rollers disposed below an extrusion slit and having an interval widened wider than a thickness of the sheet-shaped resin in the molten state immediately after an extrusion.

Moreover, when the sheet-shaped resin in the molten state is stretched between the extrusion slit and the pair of rollers by the pair of rollers, a level difference between the extrusion slit and the pair of rollers is preferably adjusted such that the sheet-shaped resin in the molten state is not torn during the stretching.

Furthermore, preferably, in the step of drawing, the sheet-shaped resin in the molten state is supplementarily drawn downward such that a slippage between the pair of rollers and the sheet-shaped resin in the molten state sandwiched by the pair of rollers is not generated.

Moreover, the step of drawing preferably includes a step of clamping the lowest portion of the sheet-shaped resin in the molten state sent out downward by the pair of rollers and a step of drawing the lowest portion of the clamped sheet-shaped resin downward.

In addition, preferably, the step of drawing is performed between a clamp start position of the lowest portion of the sheet-shaped resin in the molten state and a clamp release position of the lowest portion of the sheet-shaped resin in the molten state at a level lower than the clamp start position, the clamp start position being set to a level between the pair of rollers and the mold, the clamp release position being set to a level lower than the mold.

Additionally, the molding method for the resin molded article preferably includes a step of adjusting an interval between the pair of rollers so as to load a constant pressing force to the sheet-shaped resin in the molten state while the pair of rollers are rotationally driven.

Moreover, an initial sending out speed by the pair of rollers and/or an initial drawing speed is preferably set in a relationship with a melt index of the sheet-shaped resin in the molten state corresponding to a difference between a thickness of the sheet-shaped resin in the molten state immediately after the extrusion and a target thickness of the sheet-shaped resin in the molten state immediately before molding by the split mold block.

Furthermore, preferably, an initial sending out speed by the pair of rollers is set to a maximum within a range where the sheet-shaped resin in the molten state is not torn by the first stretching, an initial drawing speed is set to a maximum within a range where the sheet-shaped resin in the molten state is not torn by the second stretching, and the drawing speed is adjusted based on the initial drawing speed such that a draw-down is not generated in the sheet-shaped resin in the molten state after being sent out by the pair of rollers until being molded by the split mold block.

A molding apparatus for a thermoplastic resin according to the present invention to achieve the object includes: a primary molding unit that forms the thermoplastic resin by an extrusion molding, the primary molding unit extruding the thermoplastic resin to which a primary molding is performed in a drooping form; and a secondary molding unit that performs a secondary molding by a blow molding or a vacuum molding to the thermoplastic resin extruded by the primary molding unit. The primary molding unit includes: a melting and mixing unit that melts and mixes the thermoplastic resin, an accumulating unit that accumulates the melted and mixed thermoplastic resin in a predetermined amount, and an extrusion slit that intermittently extrudes the accumulated thermoplastic resin so as to droop in a sheet shape in the molten state; the secondary molding unit includes: a pair of split mold blocks movable in a direction approximately perpendicular to a sheet surface between an opening position and a closed position with sandwiching the drooping sheet-shaped resin, the pair of split mold blocks including cavities formed on surfaces opposing to one another; and a mold moving unit that moves the pair of split mold blocks in the direction approximately perpendicular to the sheet surface between the opening position and the closed position. The molding apparatus further includes: a pair of rollers positioned at a predetermined position below the extrusion slit and above the pair of split mold blocks, the pair of rollers including respective rotation axes disposed in parallel with one another and approximately horizontally, one being a rotationally driving roller, another being a driven roller, a roller rotationally driving unit that rotationally drives the rotationally driving roller, a roller moving unit that moves any one of the rollers among the pair of rollers with respect to the corresponding roller or moves both the rollers within a planar surface encompassing the pair of rollers, and a relative speed difference adjustment unit that adjusts a relative speed difference between an extrusion speed of the extruded sheet made of the thermoplastic resin in the molten state and a downward sending out speed by the pair of rollers of the sheet made of the thermoplastic resin sandwiched between the pair of rollers. The molding apparatus further includes a sheet-shaped resin drawing unit that includes: a clamp portion that is configured to clamp a lowest portion of the sheet-shaped resin sent out downward by the pair of rollers, a clamp portion moving unit that moves the clamp portion in a vertical direction, and a clamp portion moving speed adjustment unit that adjusts a moving speed of the clamp portion in the vertical direction by the clamp portion moving unit corresponding to the sending out speed of the sheet-shaped thermoplastic resin by the pair of rollers in a state where the lowest portion of the sheet-shaped thermoplastic resin is clamped by the clamp portion.

Moreover, preferably, the relative speed difference adjustment unit includes a roller rotation speed adjustment unit that adjusts a rotation speed of the rotationally driving roller in a range where the sending out speed is equal to or more than the extrusion speed corresponding to the extrusion speed of the sheet made of the thermoplastic resin in a state where the sheet made of the thermoplastic resin is sandwiched between the pair of rollers, and the clamp portion moving speed adjustment unit adjusts a moving speed of the clamp portion in a range where the drawing speed of the sheet-shaped resin by the clamp portion moving speed adjustment unit is equal to or more than the sending out speed corresponding to the sending out speed of the sheet made of the thermoplastic resin by the pair of rollers.

Furthermore, preferably, the clamp portion moving unit is configured to move the clamp portion between a clamp start position where clamping of the lowest portion of the sheet-shaped thermoplastic resin is started by the clamp portion and a clamp release position below the clamp start position and where clamping of the lowest portion of the sheet-shaped thermoplastic resin is released by the clamp portion, and the clamp release position is at a level lower than the pair of split mold blocks.

In the present invention, after the resin sheet in the molten state is sent out by the pair of rollers, the resin sheet in the molten state is drawn by the clamp. With this, a technical drawback caused by the pair of rollers sending out the resin sheet in the molten state is compensated by the clamp drawing the resin sheet in the molten state. Furthermore, a technical drawback caused by the clamp drawing the resin sheet in the molten state is compensated by the pair of rollers sending out the resin sheet in the molten state. This achieves a technical synergistic effect brought by the combination of the pair of rollers sending out the resin sheet in the molten state and the clamp drawing the resin sheet in the molten state.

More specifically, suppose that thinning of the resin sheet in the molten state is performed only by the pair of rollers sending out the resin sheet in the molten state. In this case, there is a limitation in restraining the draw-down that is generated by the resin sheet's own weight with a progress of sending out by the adjustment of the rotation speed of the pair of rollers, that is, the sending out speed. The resin sheet sent out from the pair of rollers can only be thinned within a range considering the resin sheet is pulled and stretched by its own weight without being adjusted afterwards. That is, a tear of the resin sheet in the molten state can be generated depending on a length (weight) of the resin sheet in the molten state drooping from the pair of rollers. In view of this, it has been necessary to determine the thickness of the resin sheet in a range considering the draw-down. On the other hand, performing drawing of the lower end portion of the resin sheet in the molten state by the clamp after the resin sheet in the molten state is sent out by the pair of rollers ensures uniformly loading a tensile force to a whole portion of the resin sheet in the molten state that droops from the pair of rollers. Thereby, a uniform stretching effect can be applied over the whole portion of the resin sheet in the molten state that droops from the pair of rollers. This restrains the draw-down. Furthermore, an active drawing by the clamp ensures adjusting the thickness of the resin sheet such that a sufficient thinning is achievable at a timing immediately before molding the resin sheet.

On the other hand, suppose that thinning of the resin sheet in the molten state is performed only by the clamp drawing the resin sheet in the molten state. In this case, speeding up the drawing speed possibly tears the resin sheet in the molten state. On the other hand, speeding up the sending out speed of the resin sheet in the molten state by the pair of rollers is less likely to generate the tear of the resin sheet in the molten state between the extrusion slit and the pair of rollers because the interval between the extrusion slit and the pair of rollers is short.

As described above, with respect to the target thickness of the resin sheet in the molten state, stretching by the pair of rollers sending out the resin sheet in the molten state mainly thins the resin sheet in the molten state. Stretching by the clamp drawing the resin sheet in the molten state after the pair of rollers sending out the resin sheet in the molten state secondarily (supplementarily) thins the resin sheet in the molten state. As a result, a difficulty in a thickness adjustment of the resin sheet and a limitation of thinning due to the draw-down are improved and the resin sheet in the molten state immediately before molding reliably becomes the target thickness.

BRIEF DESCRIPTION OF THE DRAWINGS

FIG. 1 is a schematic side view of a molding apparatus for a resin molded article according to a first example of the present invention.

EXAMPLE

Figure 2:
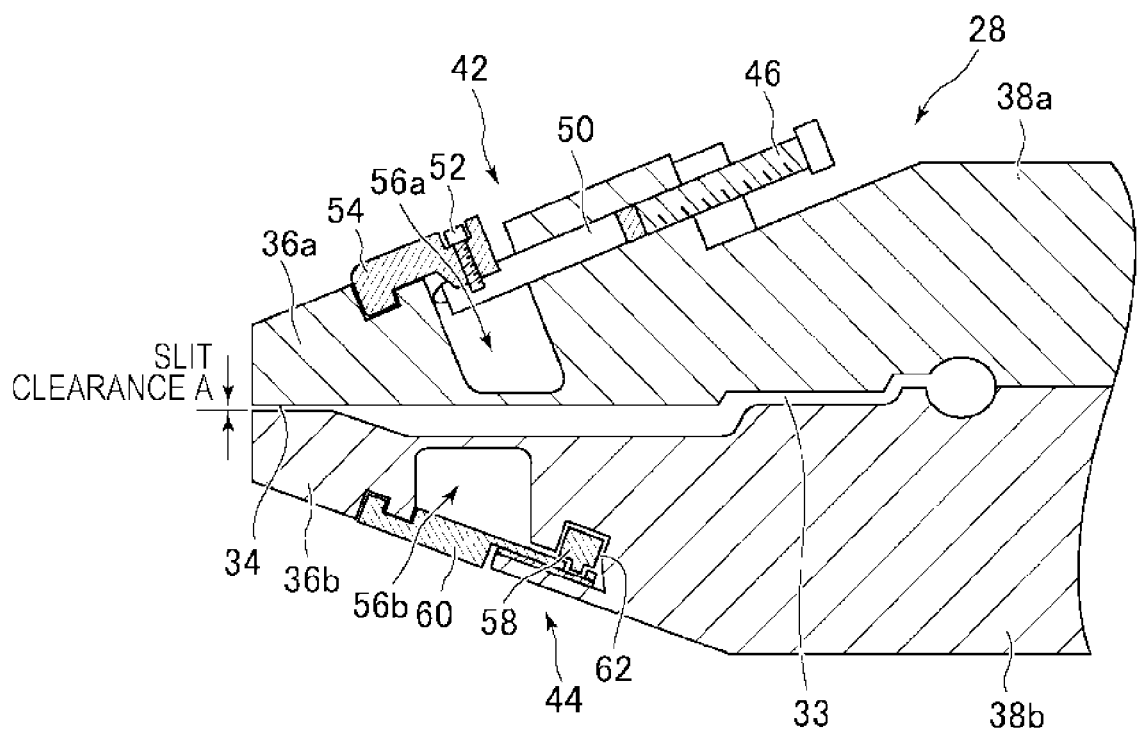
FIG. 2 is a schematic cross-sectional view of details around an extrusion slit of a T-die of the molding apparatus for the resin molded article according to the first example of the present invention.

The following describes an example of a molding apparatus for a resin molded article according to the present invention in details with reference to the drawings.

In this example, as a resin molded article, a single sheet-shaped molded article is targeted.

As illustrated in FIG. 1, a molding apparatus 10 for the resin molded article includes an extruding machine 12 and a clamping machine 14 disposed below the extruding machine 12. A sheet-shaped resin in a molten state extruded from the extruding machine 12 is sent to the clamping machine 14. The clamping machine 14 molds the sheet-shaped resin in the molten state.

The extruding machine 12 is of a conventionally-known type, thus, its detailed explanation is omitted. The extruding machine 12 includes a cylinder 18, a screw (not illustrated), a hydraulic motor 20, an accumulator 24, and a plunger 26. The cylinder 18 is equipped with a hopper 16. The screw is disposed within the cylinder 18. The hydraulic motor 20 is coupled to the screw. The accumulator 24 internally communicates with the cylinder 18. The plunger 26 disposed within the accumulator 24. Resin pellets thrown in from the hopper 16 are melted and mixed by a rotation of the screw driven by the hydraulic motor 20 inside the cylinder 18. The resin in a molten state is transported to the accumulator 24 chamber and a constant amount of the resin in the molten state is accumulated. A driving of the plunger 26 sends the molten resin toward a T-die 28. A continuous sheet-shaped resin is extruded through an extrusion slit 34. The continuous sheet-shaped resin is, while being sandwiched and pressed by a pair of rollers 30 disposed with an interval, sent out downward to droop between split mold blocks 32. This causes the sheet-shaped resin to be disposed between the split mold blocks 32 in a state of having a uniform thickness in a vertical direction (an extruding direction) as described in details later.

An extruding performance of the extruding machine 12 is selected as necessary from aspects of a size of a resin molded article to be molded and a prevention of a generation of a draw-down or a neck-in in the sheet-shaped resin. More specifically, from a practical aspect, an extrusion amount in one shot in an intermittent extrusion is preferably 1 to 10 kg and an extrusion speed of the resin from the extrusion slit 34 is several hundred kg/hour or more, more preferably, 700 kg/hour or more. From the aspect of the prevention of the generation of the draw-down or the neck-in in the sheet-shaped resin, the extruding operation of the sheet-shaped resin is preferred to be as short as possible. While it depends on a kind of resin, an MFR value, and a melt tension value, the extruding operation is generally preferred to be completed within 40 seconds, more preferably, within 10 to 20 seconds. In view of this, an extrusion amount of the thermoplastic resin from the extrusion slit 34 per unit area and unit time is 50 kg/hour·cm$^2$ or more, more preferably, 150 kg/hour·cm$^2$ or more. For example, the thermoplastic resin having a density of 0.9 g/cm$^3$ is extruded in 15 seconds as a sheet-shaped resin having a thickness of 1.0 mm, a width of 1000 mm, and a length in the extruding direction of 2000 mm from the extrusion slit 34 of the T-die 28 having a slit interval of 0.5 mm and a length in a slit width direction of 1000 mm. In this case, 1.8 kg of the thermoplastic resin is extruded in one shot of 15 seconds. The extrusion speed is 432 kg/hour, and an extrusion speed per unit area can be calculated to be approximately 86 kg/hour·cm$^2$.

As described later, the sheet-shaped resin can be stretched and thinned by a rotation of the pair of rollers 30 sending out the sheet-shaped resin sandwiched between the pair of rollers 30 downward and a downward driving of a clamp portion 304 of a clamp device 300 drawing a lower end of the sheet-shaped resin downward. The generation of the draw-down or the neck-in can be prevented by adjusting a relationship between the extrusion speed of the extruded sheet-shaped resin and a sending out speed of the sheet-shaped resin by the pair of rollers 30 and a relationship between the sending out speed of the sheet-shaped resin and a downward drawing speed by the clamp portion. In view of this, limitations relative to the kind of resin, especially the MFR value and the melt tension value, or the extrusion amount per unit time can be decreased.

As illustrated in FIG. 1, the extrusion slit 34 disposed in the T-die 28 is disposed vertically downward. A parison in a continuous sheet shape that is extruded from the extrusion slit 34 is sent vertically downward in a form of directly drooping from the extrusion slit 34. As described later, the extrusion slit 34 is configured to change a thickness of the sheet-shaped resin by its interval being variable.

As illustrated in FIG. 2 (in FIG. 2, a left side in the drawing is downward in FIG. 1), a main body of the T-die 28 is constituted by stacking a die 38a including a die lip 36a on a distal end and a die 38b including a die lip 36b on a distal end. An interval between the die lips 36a and 36b forms the interval of the extrusion slit 34. In order to adjust the interval of the extrusion slit, a slit clearance adjusting device 42 and a slit clearance driving device 44 are disposed. In proximities of the die lip 36a and the die lip 36b, recessed grooves 56a and 56b are respectively disposed. The die lip 36a and the die lip 36b easily deflect in a vertical direction in the drawing. As a result, each of the slit clearance adjusting device 42 and the slit clearance driving device 44 adjusts the interval of the extrusion slit 34. The slit clearance adjusting device 42 and the slit clearance driving device 44 both have known configurations. The slit clearance adjusting device 42 functions so as to adjust a uniformity of a thickness in a width direction of the sheet (a direction from a back to a front in the drawing) by deforming the die lip 36*a*. On the other hand, the slit clearance driving device 44 functions so as to adjust a thickness in a direction extruding the sheet (a right-left direction in the drawing) by deforming the die lip 36*b*. The thermoplastic resin supplied to the T-die 28 is extruded as the sheet from the extrusion slit 34 passing through a resin channel 33 from a manifold of the main body of the T-die 28 illustrated in FIG. 2.

While as the slit clearance adjusting device 42, a thermal expansion type device or a mechanical type device is available, it is preferred to use a device including both functionalities of the thermal expansion type device and the mechanical type device. A plurality of the slit clearance adjusting devices 42 are disposed at equal intervals along the width direction of the extrusion slit 34. Each of the slit clearance adjusting devices 42 each narrowing or widening a slit clearance A makes the thickness of the sheet in the width direction uniform.

Each of the slit clearance adjusting devices 42 is constituted of a die bolt 46, an adjustment shaft 50, and an engaging piece 54. The adjustment shaft 50 is coupled to the die bolt 46. The engaging piece 54 is coupled to the adjustment shaft 50 via a fastening bolt 52. Each of the slit clearance adjusting devices 42 is disposed so as to stride over the recessed groove 56*a* using the die bolt 46, the adjustment shaft 50, and the engaging piece 54. More specifically, the slit clearance adjusting device 42 includes the die bolt 46 that is disposed so as to freely reciprocate toward the die lip 36*a* on one side. At the distal end of the die bolt 46, the adjustment shaft 50 is disposed via a pressure transmission portion. The adjustment shaft 50 is joined to the engaging piece 54 with the fastening bolt 52. The engaging piece 54 is coupled to the die lip 36*a* on the one side. Causing the die bolt 46 to advance extrudes the adjustment shaft 50 in a distal end direction via the pressure transmission portion and the die lip 36*a* on the one side is pressed. With this, a portion of the recessed groove 56*a* deforms the die lip 36*a* and the slit clearance A is narrowed. To widen the slit clearance A, the die bolt is retreated in contrast to this.

Furthermore, using a thermal expansion type adjustment unit in conjunction with the above-described mechanical type adjustment unit ensures an accurate adjustment of the slit clearance A. Specifically, an electric heater (not illustrated) heating and causing a thermal expansion to the adjustment shaft 50 presses the die lip 36*a* on the one side and narrows the slit clearance A. To widen the slit clearance A, the electric heater is stopped and the adjustment shaft 50 is cooled down and contracted by a cooling unit (not illustrated).

In contrast, the slit clearance driving device 44 is constituted of a sliding bar 58 and a driving piece 60. The sliding bar 58 is disposed within a sliding groove 62. The sliding bar 58 is movable in the width direction of the slit by a driving unit described later. The driving piece 60 is coupled to the die lip 36*b* on the other side. When the sliding bar 58 advances and retreats in the width direction of the slit, in conjunction with this, the driving piece 60 presses and pulls the die lip 36*b* on the other side. With this, a portion of the recessed groove 56*b* deforms the die lip 36*b* and the slit clearance A can be varied.

The sheet extruded from the T-die 28 is preferred to be adjusted such that the thickness in the extruding direction is uniform in a state where the sheet droops between the split mold blocks 32, that is, at a time point where the sheet is mold-clamped. In this case, the slit clearance A is gradually widened from a start of the extrusion and is varied so as to reach maximum at a termination of the extrusion. This causes the thickness of the sheet extruded from the T-die 28 to be gradually thickened from the start of the extrusion. However, the sheet extruded in the molten state is gradually thinned from the lower side to the upper side of the sheet by being pulled and stretched by its own weight. In view of this, an amount that is thickly extruded by widening the slit clearance A and an amount that is thinly extruded by being pulled and stretched by the draw-down phenomenon cancel each other out, thus, the sheet can be adjusted to have a uniform thickness from the upper portion to the lower portion.

Figure 3:
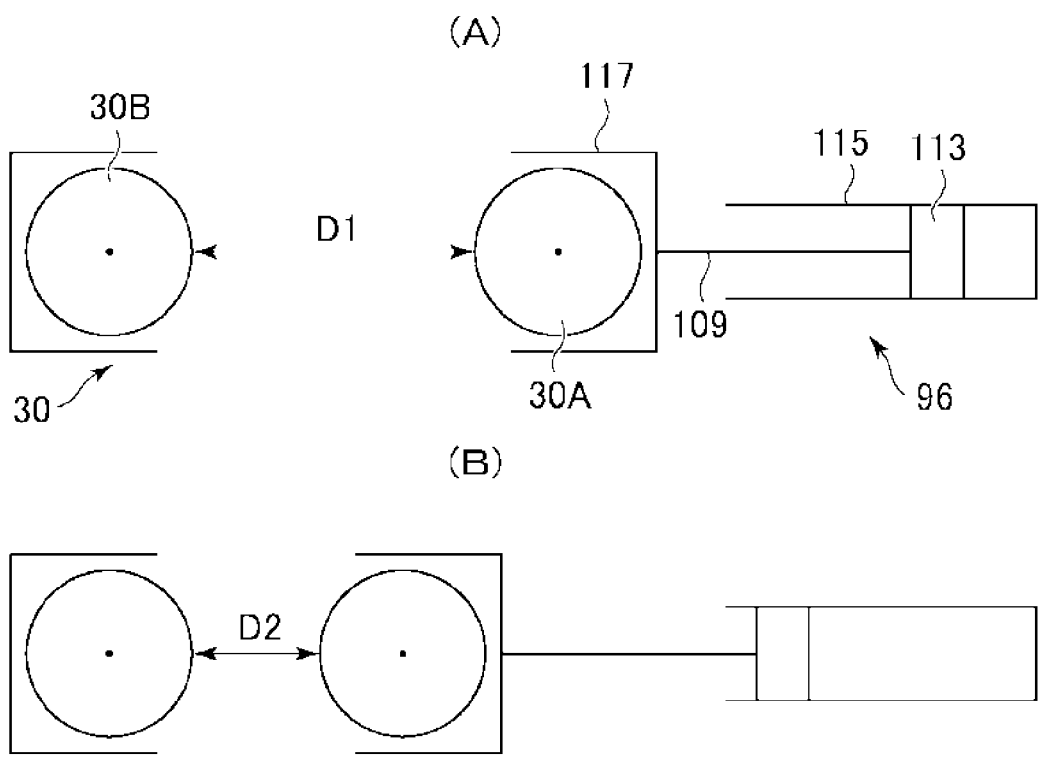
FIGS. 3(A) and (B) are schematic side views around a pair of rollers of the molding apparatus for the resin molded article according to the first example of the present invention.

With reference to FIG. 3, the pair of rollers 30 will be described. The pair of rollers 30 have respective rotation axes disposed in parallel with one another and approximately horizontally below the extrusion slit 34. One is a rotationally driving roller 30A and the other is a rotationally driven roller 30B. In further details, as illustrated in FIG. 1, the pair of rollers 30 are disposed so as to be linearly symmetrical with respect to the sheet-shaped resin extruded in the form of drooping downward from the extrusion slit 34.

Diameters of the respective rollers and axial lengths of the respective rollers are simply set as necessary corresponding to an extrusion speed of the sheet-shaped resin to be molded, a length in the extruding direction and a width of the sheet, a kind of resin, and the like. As described later, from a perspective of smoothly sending out the sheet-shaped resin downward by the rotation of the rollers in a state where the sheet-shaped resin is sandwiched between the pair of rollers 30, the diameter of the rotationally driving roller 30A is preferred to be slightly larger than the diameter of the rotationally driven roller 30B. The diameters of the rollers are preferred to be in a range of 50 to 300 mm. In contacting with the sheet-shaped parison, curvatures of the rollers being too large and too small become a cause of a failure in which the sheet-shaped parison entangles around the rollers.

The rotationally driving roller 30A is equipped with a roller rotationally driving unit 94 and a roller moving unit 96. With the roller rotationally driving unit 94, the rotationally driving roller 30A is rotatable using its axial direction as a center. On the other hand, with the roller moving unit 96, the rotationally driving roller 30A is configured so as to move close to the rotationally driven roller 30B or away from the rotationally driven roller 30B while keeping a parallel positional relationship with the rotationally driven roller 30B in a planar surface encompassing the pair of rollers 30.

More specifically, the roller rotationally driving unit 94 is a rotationally driving motor 98 coupled to the rotationally driving roller 30A. A rotating torque of the rotationally driving motor 98 is transmitted to the rotationally driving roller 30A via, for example, a gear reduction mechanism (not illustrated). The rotationally driving motor 98 is a conventionally known one that is equipped with a rotation number adjusting device 100 so as to ensure adjusting the number of rotations of the rotationally driving motor 98. This rotational number adjusting device 100 may be, for example, one that adjusts a current value to the electric motor. The rotation number adjusting device 100 is, as described later, configured to adjust a relative speed difference between the extrusion speed of the sheet-shaped resin extruded from the extrusion slit 34 and the sending out speed of the sheet-shaped resin sent out downward by the rotation of the pair of rollers 30 corresponding to the extrusion speed of the sheet-shaped resin. Regarding the sending out speed of the sheet-shaped resin by the rollers, for example, when the sheet-shaped resin having a length of 2000 mm is sent out in 15 seconds in the sending out direction using the pair of rollers having diameters of 100 mm, the pair of rollers rotates for approximately 6.4 rotations in one shot of 15 seconds. The rotation speed of the rollers can be calculated to be approximately 25.5 rpm. Increasing and decreasing the rotation speed of the rollers ensures an easy adjustment of the sending out speed of the sheet-shaped resin as the sheet-shaped resin.

Figure 4:
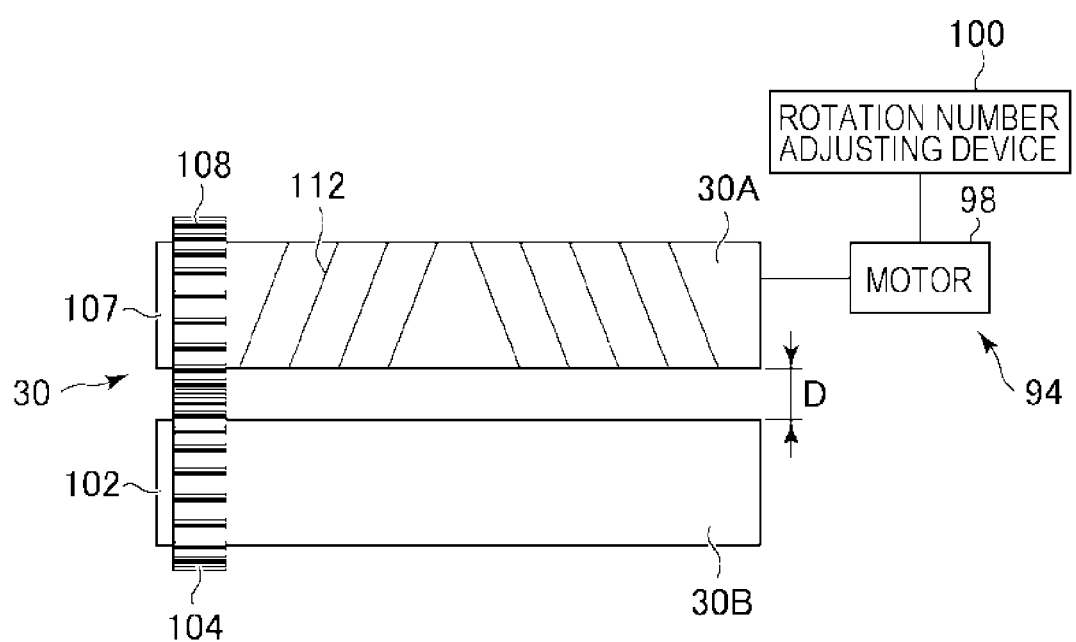
FIG. 4 is a schematic plan view around the pair of rollers of the molding apparatus for the resin molded article according to the first example of the present invention.

As illustrated in FIG. 4, the rotationally driven roller 30B includes a first gear 104 and on the other hand, the rotationally driving roller 30A includes a second gear 108 such that the rotationally driven roller 30B is rotationally driven synchronized with the rotationally driving roller 30A. The first gear 104 is rotatable using the rotation axis of the roller as a center over an end peripheral surface 102 of the rotationally driven roller 30B. The second gear 108 is rotatable using the rotation axis of the roller as a center over an end peripheral surface 106 of the rotationally driving roller 30A and meshes with the first gear 104.

As illustrated in FIG. 3, the roller moving unit 96 is constituted of a piston-cylinder mechanism 97. A distal end of a piston rod 109 is coupled to a cover 111 that rotatably supports the rotationally driving roller 30A in the axial direction. For example, adjusting an air pressure causes a piston 113 to slide with respect to a cylinder 115. This moves the rotationally driving roller 30A in a horizontal direction. As a result, the interval between the pair of rollers 30 is adjustable. In this case, the interval between the pair of rollers 30 is widened wider than a thickness of the supplied sheet-shaped resin (an opening position constituting an interval D1 in FIG. 3(A)) before the lowest portion of the sheet-shaped resin is supplied between the pair of rollers 30 as described later. This smoothly supplies the sheet-shaped resin between the pair of rollers 30. Thereafter, the interval between the pair of rollers 30 is narrowed and the pair of rollers 30 sandwiches the sheet-shaped resin (a closed position constituting an interval D2 in FIG. 3(A)). This sends out the sheet-shaped resin downward by the rotation of the rollers. A stroke of the piston 113 is only necessary to be set to a distance between the opening position and the closed position. Adjusting the air pressure also ensures an adjustment of a pressing force from the rollers that acts on the sheet-shaped resin when the sheet-shaped resin passes through between the pair of rollers 30. A range of the pressing force is determined such that a slippage is not generated between a surface of the pair of rollers 30 and a surface of the sheet-shaped resin by the rotation of the pair of rollers 30 and on the other hand, the sheet-shaped resin is surely sent out downward without being torn by the pair of rollers 30. While the range of the pressing force depends on a kind of resin, it is, for example, from 0.05 MPA to 6 MPA.

It is preferred to adjust a level difference between the extrusion slit 34 and the pair of rollers 30 such that the sheet-shaped resin in the molten state is not torn while being stretched when the sheet-shaped resin in the molten state is stretched between the extrusion slit 34 and the pair of rollers 30 by the pair of rollers 30.

The rotationally driving roller 30A has a pair of shallow grooves 112 in helical shapes that are disposed over an outer peripheral surface of the rotationally driving roller 30A. The shallow grooves 112 are each directed so as to guide the sheet-shaped resin toward each end of the rotationally driving roller 30A when the sheet-shaped resin is sent out downward by the rotation of the pair of rollers 30. This ensures causing the sheet-shaped resin to be in a state of being tensioned to a direction to widen the width of the sheet-shaped resin by passing the sheet-shaped resin through the pair of rollers 30. A pitch and a depth of the shallow groove 112 are simply set as necessary corresponding to a material of the sheet-shaped resin, the set rotation speed of the rollers, and the like. The pitch of the shallow groove in FIG. 4 is exaggeratedly illustrated for ease of understanding.

The rotationally driving roller 30A may be equipped with a surface temperature adjusting unit that adjusts a surface temperature of the rollers corresponding to the temperature of the sheet-shaped resin. For example, the surface temperature adjusting unit may be constituted so as to execute a heat exchange such that the sheet-shaped resin in the molten state sandwiched by the pair of rollers 30 does not excessively heat the surfaces of the rollers by internally passing a coolant in the rollers and circulating this coolant. It is preferred that the outer peripheral surfaces of the rollers are provided with a heat-resistant coating.

As illustrated in FIG. 1, the clamp device 300 includes the clamp portion 304, an arm portion 302, and an arm drive unit 304. The arm portion 302 includes the clamp portion 304 on one end. The arm drive unit 304 is disposed on the other end of the arm portion 302.

The clamp portion 304 includes a pair of the clamp portions 304. The pair of clamp portions 304 is turnable between a clamp position and a clamp release position using a pin 303 disposed on one end of the arm portion 302 as a center. The pair of the clamp portions 304 each extend over a predetermined length (a vertical direction in the drawing) so as to be able to clamp the sheet-shaped resin in the molten state having a predetermined width in a direction perpendicular to an extruding direction. It is preferred to dispose hook portions that are configured to dig into the sheet-shaped resin in the molten state on distal ends of the pair of the clamp portions 304 such that a slippage is not generated between the pair of the clamp portions 304 and the sheet-shaped resin when the sheet-shaped resin in the molten state is drawn downward in a clamped state.

The arm portion 302 is configured to extend and contract in the vertical direction between a clamp start level (PH) and a clamp release level (PL) by the arm drive unit 304. The arm portion 302 is positioned such that the vertical direction of the arm portion 302 corresponds to the extruding direction of the sheet-shaped resin in the molten state between the split mold blocks. The arm portion 302 clamps a lower end portion of the sheet in the molten state sent out by the pair of rollers at the clamp start level (PH). The arm portion 302 moves down to the clamp release level (PL) in a state of clamping the lower end portion of the sheet, and releases clamping there.

The clamp start level (PH) is disposed between the pair of rollers and an upper end of the split mold blocks. The clamp release level (PL) is disposed below with respect to a lower end of the split mold blocks. This eliminates interference from the mold clamping to the mold opening of the split mold blocks. When the split mold blocks are in a mold open state, the arm portion 302 extends to the clamp start level (PH) and moves down to the clamp release level (PL). This ensures the mold clamping of the split mold blocks in a state where the sheet-shaped resin in the molten state is disposed between the split mold blocks.

An adjustment of an amount of extension and contraction of the arm portion 302 by the arm drive unit 304 ensures adjustments of the clamp start level (PH) and the clamp release level (PL) independently from one another. For example, corresponding to a thinning amount by drawing the sheet in the molten state by the clamp device 300, in a relationship with a drawing speed of the arm drive unit 304, a level difference between the clamp start level (PH) and the clamp release level (PL) may be determined.

The clamp start level (PH) and the clamp release level (PL) of the sheet-shaped resin in the molten state are determined corresponding to a length of a cavity 116 along the extruding direction of the sheet-shaped resin determined corresponding to a dimension of the molded article and the drawing speed of the clamp device 30 may be determined corresponding to the clamp start level (PH) and the clamp release level (PL) of the sheet-shaped resin in the molten state.

The arm drive unit 304 is configured to move the arm portion 302 in the vertical direction between the clamp start level (PH) and the clamp release level (PL). Then, the arm drive unit 304 is configured to adjust a moving speed of the arm portion 302 in the vertical direction, that is, the drawing speed of the sheet-shaped resin in the molten state clamped by the clamp portion 304. Specifically, the arm drive unit 304 is coupled to a ball screw. A rotation of the ball screw controls a position and a moving speed of the arm portion 302. When two strips of sheet-shaped resins in the molten state are each drawn by the corresponding clamp devices 300, it is preferred that the arm drive units 304 of the clamp devices 300 are synchronized such that the two strips of sheet-shaped resins in the molten state are simultaneously disposed between the split mold blocks, that is, one of the sheet-shaped resins is not left in a waiting state.

A clamp portion moving speed adjustment unit (not illustrated) is disposed. Corresponding to the sending out speed of the sheet-shaped thermoplastic resin by the pair of rollers 30, the clamp portion moving speed adjustment unit adjusts the moving speed of the clamp portion in a range where the drawing speed of the sheet-shaped resin is equal to or more than the sending out speed. Furthermore, a speed difference setting unit (not illustrated) is disposed. The speed difference setting unit sets a speed difference between the drawing speed and the sending out speed to equal to or less than a speed difference between the sending out speed and a predetermined extrusion speed.

On the other hand, the clamping machine 14 is also of a conventionally known type similar to the extruding machine 12, and its detailed description is omitted. The clamping machine 14 includes the two split-format molds 32A and B and a mold driving device. The mold driving device moves the molds 32A and B between the opening position and the closed position in a direction perpendicular to a supply direction of the sheet-shaped resin in the molten state.

As illustrated in FIG. 1, the two split-format molds 32A and B are disposed in a state where the cavities 116 are opposing. Each of the cavities 116 is disposed to face approximately vertical direction. Each of the cavities 116 has a surface that has a dent and protrusion corresponding to an outer shape and a surface shape of the molded article molded based on the sheet-shaped resin in the molten state. Each of the two split-format molds 32A and B includes a pinch-off part 118 around the cavity 116. These pinch-off parts 118 are formed into ring shapes around the cavities 116 and project toward the opposing molds 32A and B. This causes apex portions of the respective pinch-off parts 118 to abut on one another when the two split-format molds 32A and B are mold-clamped and a parting line PL is formed on a peripheral edge of the sheet-shaped resin in the molten state.

When a resin molded article in a single-sheet shape is molded, the following molding may be performed as an alternative of mold-clamping the molds using the split-format molds. In this molding, a single mold is used and the extruded sheet-shaped resin is disposed in a side portion of such mold. Without mold-clamping, a sealed space formed between the sheet-shaped resin and the mold is depressurized and/or the sheet-shaped resin is pressurized toward the mold. This molds the sheet-shaped resin into a shape conforming to a mold shape.

On outer periphery portions of the two split-format molds 32A and B, frames 33A and B are slidably fitted, respectively. The frames 33A and B are relatively movable with respect to the molds 32A and B, respectively with respect to a frame moving device (not illustrated). More specifically, the frame 33A projects toward the mold 32B with respect to the mold 32A. This ensures the frame 33A coming in contact with one side surface of the sheet-shaped resin disposed between the molds 32A and B. The frame 33B projects toward the mold 32A on the mold 32B. This ensures the frame 33B coming in contact with the other side surface of the sheet-shaped resin disposed between the molds 32A and B.

The mold driving device is similar to a conventional one, and its description is omitted. In the opening position, each of the two split-format molds 32A and B is driven by the mold driving device such that the sheet-shaped resin in the molten state can be disposed between the two split mold blocks 32A and B. On the other hand, in the closed position, each of the two split-format molds 32A and B is driven by the mold driving device such that the pinch-off parts 118 of the two split mold blocks 32A and B abut and the sealed space is formed within the two split mold blocks 32A and B by the circular pinch-off parts 118 abutting onto one another. Regarding a movement of each of the molds 32A and B from the opening position to the closed position, the closed position is a position of a center line of the sheet-shaped resin in the molten state. Each of the molds 32A and B is driven by the mold driving device to move toward that position.

Figure 7:
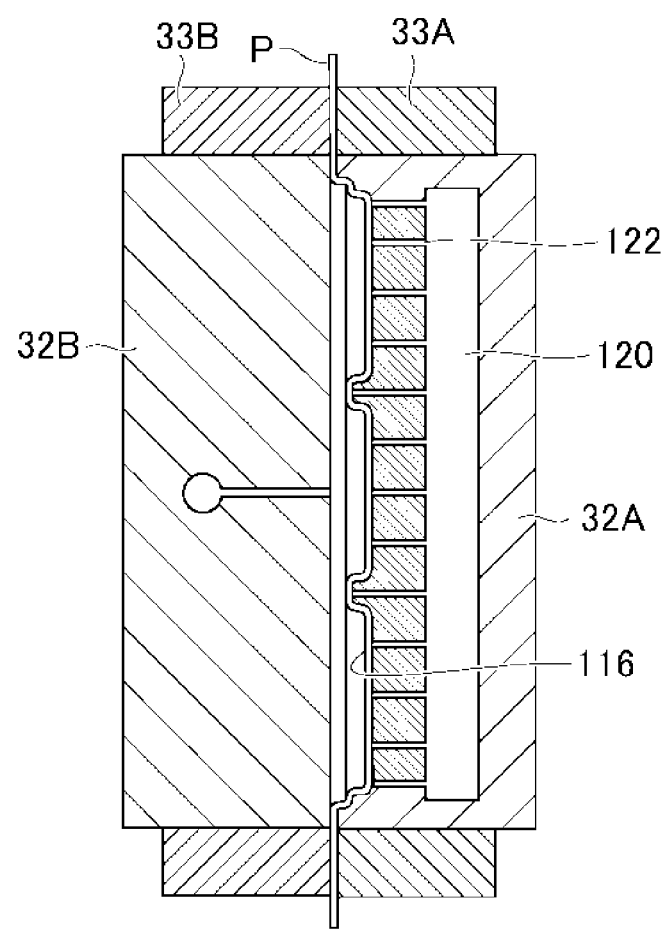
FIG. 7 is a schematic side view of a state where the split mold blocks are mold-clamped in the molding apparatus for the resin molded article according to the first example of the present invention.

As illustrated in FIG. 7, one of the split mold blocks 32 internally includes a vacuum suction chamber 120. The vacuum suction chamber 120 communicates with the cavity 116 via suction holes 122. Suction from the vacuum suction chamber 120 via the suction holes 122 attracts the sheet-shaped resin toward the cavity 116 to form the sheet-shaped resin into a shape conforming to an outer surface of the cavity 116.

The sheet-shaped resin is made of a sheet formed of polypropylene, engineering plastics, olefin-based resin, and the like. More specifically, for the sheet-shaped resin, it is preferred to use a resin material high in melt tensile force from an aspect of preventing a variation of a wall thickness from being generated due to the draw-down, the neck-in, or the like. Meanwhile, for the sheet-shaped resin, it is preferred to use a resin material high in fluidity in order to have excellent transferability and following capability to the mold.

Specifically, the sheet-shaped resin is formed using the following polyolefin or amorphous resin. This polyolefin is a homopolymer or a copolymer (such as polypropylene and high-density polyethylene) of olefins, such as ethylene, propylene, butane, isoprene pentene, and methyl pentene. An MFR of this polyolefin at 230° C. is 3.0 g/10 minutes or less, more preferably, 0.3 to 1.5 g/10 minutes. These MFRs are values measured at a test temperature of 230° C. and with a test load of 2.16 kg according to Japanese Industrial Standard K-7210. The above-described amorphous resin is acrylonitrile-butadiene-styrene copolymer, polystyrene, high impact polystyrene (HIPS resin), acrylonitrile-styrene copolymer (AS resin), and the like. An MFR of this amorphous resin at 200° C. is 3.0 to 60 g/10 minutes, more preferably, 30 to 50 g/10 minutes. These MFRs are values measured at a test temperature of 200° C. and with a test load of 2.16 kg according to Japanese Industrial Standard K-7210. Furthermore, a melt tension of this amorphous resin at 230° C. is 50 mN or more, preferably, 120 mN or more. This melt tension is the following tensile force obtained by using a melt tension tester manufactured by Toyo Seiki Seisaku-sho, Ltd. This tensile force is a tensile force when a strand is extruded at a remaining heat temperature of 230° C. and an extrusion speed of 5.7 mm/minute from an orifice with a diameter of 2.095 mm and a length of 8 mm, and this strand is rolled up around a roller with a diameter of 50 mm at a rolling up speed of 100 rpm.

For the sheet-shaped resin, it is preferred that hydrogenated styrenic thermoplastic elastomer is added in a range of less than 30 wt %, preferably, less than 15 wt % in order to prevent a crack by an impact from generated. Specifically, as the hydrogenated styrenic thermoplastic elastomer, styrene-ethylene/butylene-styrene block copolymer, styrene-ethylene/propylene-styrene block copolymer, hydrogenated styrene-butadiene rubber, and its mixture are preferable. A content of the styrene is less than 30 wt %, preferably, less than 20 wt %. An MFR at 230° C. is 1.0 to 10 g/10 minutes, preferably, 5.0 g/10 minutes or less and 1.0 g/10 minutes or more. These MFRs are values measured at a test temperature of 230° C. and with a test load of 2.16 kg according to Japanese Industrial Standard K-7210.

Furthermore, the sheet-shaped resin may include additives. The additives include an inorganic filler, such as silica, mica, talc, calcium carbonate, glass fiber, and carbon fiber; a plasticizer; a stabilizer; a colorant; an antistatic agent; a flame retardant; a foaming agent; and the like.

Specifically, for example, silica, mica, and glass fiber are added to the mold resin for 50 wt % or less, preferably, 30 to 40 wt %.

The following describes an operation of the molding apparatus 10 for the resin molded article having the above-mentioned configuration with reference to the drawings.

First, a predetermined amount of melted and mixed thermoplastic resin is accumulated in the accumulator 24. The accumulated thermoplastic resin is intermittently extruded from the extrusion slit 34 having a predetermined interval disposed in the T-die 28 at a predetermined extrusion amount per unit time. With this, the thermoplastic resin swells and is extruded in a predetermined thickness at the predetermined extrusion speed so as to droop downward into a sheet shape in the molten state.

Next, driving the piston-cylinder mechanism 96 moves the pair of rollers 30 to the opening position as illustrated in FIG. 3(A), and widens the interval between the pair of rollers 30 disposed below the extrusion slit 34 wider than a thickness of the sheet-shaped resin. This smoothly supplies the lowest portion of the sheet-shaped resin in the molten state extruded downward between the pair of rollers 30. A timing to widen the interval between the rollers 30 wider than the sheet-shaped resin may be at a time point where the secondary molding at every one shot is terminated, not after the start of extrusion.

Figure 5:
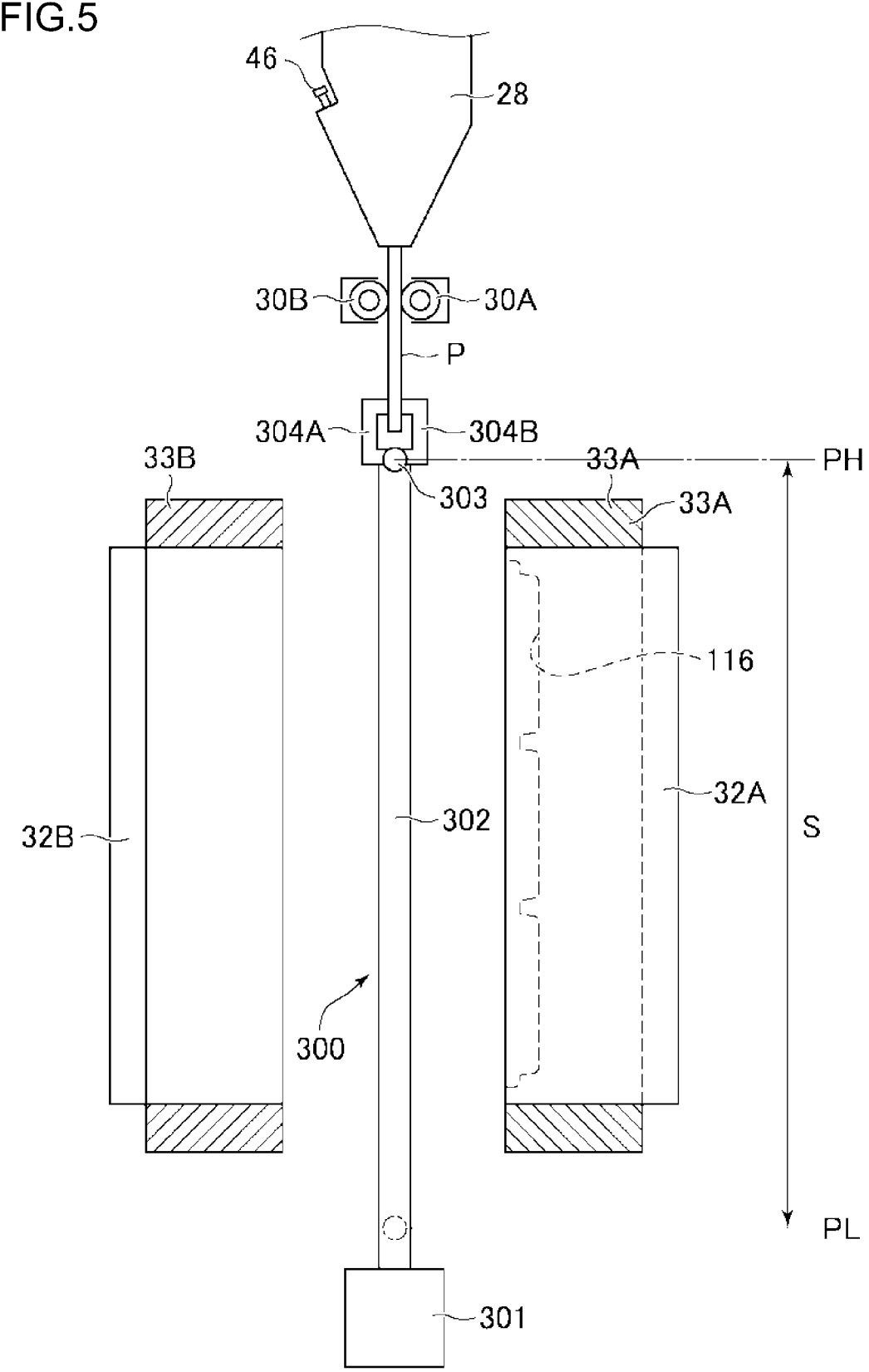
FIG. 5 is a schematic side view of a state where the sheet-shaped resin is clamped in the molding apparatus for the resin molded article according to the first example of the present invention.

Next, driving the piston-cylinder mechanism 96 causes the pair of rollers 30 to come close to one another and moves the pair of rollers 30 to the closed position as illustrated in FIG. 3(B), and narrows the interval between the pair of rollers 30 to sandwich the sheet-shaped resin by the pair of rollers 30. The rotation of the rollers sends out the sheet-shaped resin downward and an arm drive unit 301 extends the arm portion 302 upward from the clamp release level (PL) to the clamp start level (PH) as illustrated in FIG. 5. The clamp portions 304A and B in an open state stand by at the clamp start level (PH) and wait for the sheet-shaped resin that is sent out downward by the pair of rollers 30. The clamp portions 304A and B are closed to clamp the lower end portion of the sheet-shaped resin and draw downward to the clamp release level (PL).

Then, the peripheral surfaces of the pair of rollers 30 and sheet surfaces of the sheet-shaped resin in the molten state are brought into line or surface contact while the pair of rollers 30 are rotationally driven. The interval between the pair of rollers 30 is adjusted so as to load a constant pressing force to the sheet-shaped resin in the molten state such that this contact position does not generate an excessive slippage.

Figure 26:
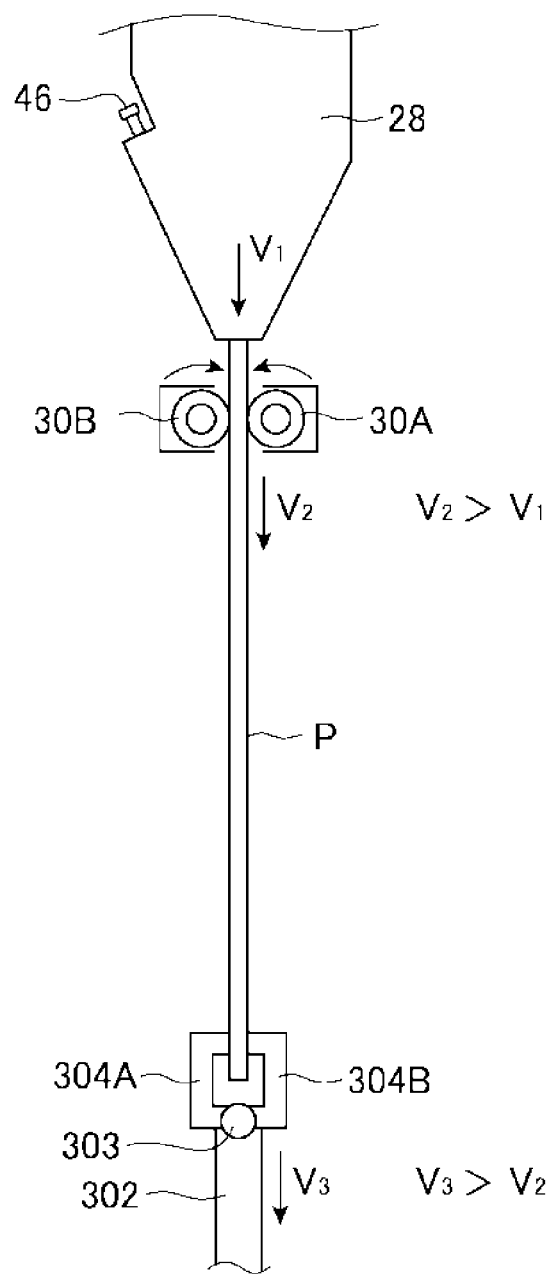
FIG. 26 is a schematic diagram illustrating a relationship between the extrusion speed of the sheet-shaped resin in the molten state, the sending out speed by the pair of rollers, and the drawing speed by a clamp device 300 in the molding apparatus for the resin molded article according to each of the first example to the third example of the present invention.

In more details, as illustrated in FIG. 26, while the sheet-shaped resin in a swelling state is being sent to the pair of rollers 30 by the rotation of the rollers 30, the rotation speed of the rollers is adjusted such that a downward sending out speed V2 of the sheet-shaped resin by the pair of rollers 30 becomes equal to or more than an extrusion speed V1 of the sheet-shaped thermoplastic resin. Together with this, a driving speed of the arm 302 is adjusted by the arm drive unit 301 such that a downward drawing speed V3 of the sheet-shaped resin by the clamp device becomes equal to or more than the sending out speed V2.

More specifically, in a step of sending out the sheet-shaped resin in the molten state downward so as to allow a first stretching by the rotationally driving of the pair of rollers 30 and a step of drawing downward the sheet-shaped resin in the molten state sent out downward so as to allow a second stretching, the thinning amount of the sheet-shaped resin in the molten state is constituted of a difference between a thickness of the sheet-shaped resin in the molten state in a step of extruding and a thickness of the sheet-shaped resin in the molten state in a step of disposing in the side portion of the mold. It is preferred that a relationship between a speed difference between the drawing speed V3 and the sending out speed V2 and a speed difference between the sending out speed V2 and the predetermined extrusion speed V1 are set such that in this thinning amount, the thinning amount of the sheet-shaped resin in the molten state by the first stretching becomes larger than the thinning amount of the sheet-shaped resin in the molten state by the second stretching. The speed difference between the drawing speed V3 and the sending out speed V2 is set to equal to or less than the speed difference between the sending out speed V2 and the extrusion speed V1.

As the sheet-shaped resin in the swelling state is sent out below the pair of rollers 30, a length of the sheet-shaped resin drooping in the vertical direction gets long. Caused by this, the upper the portion of the drooping sheet-shaped resin, the thinner it gets by the sheet-shaped resin's own weight (the draw-down or the neck-in). The rotation speed of the rollers is adjusted such that the sending out speed V2 by the pair of rollers 30 becomes equal to or more than the extrusion speed V1. Together with this, the driving speed of the arm 302 is adjusted such that the drawing speed V3 becomes equal to or more than the sending out speed V2.

This causes the sheet-shaped resin to be pulled downward between the extrusion slit and a first pair of rollers 30, thus the first stretching is performed. Furthermore, the sheet-shaped resin is pulled downward between the pair of rollers 30 and the arm drive unit 301, thus the second stretching is performed. Thereby, the sheet-shaped resin is stretched and thinned.

At this time, with a lapse of time, an adjustment is performed such that the sending out speed V2 is made close to the extrusion speed V1 of the sheet-shaped thermoplastic resin by decreasing the rotation speed of the rollers and the drawing speed V3 is made close to the sending out speed V2 by decreasing the driving speed of the arm 302.

In this case, it is preferred that the drawing speed and/or a drawing period is adjusted corresponding to a desired thickness of the sheet-shaped resin in the molten state in the step of disposing in the side portion of the mold. A step of adjusting the drawing period is preferred to be performed by a level adjustment of the clamp start level (PH) and/or the clamp release level (PL).

An initial sending out speed of the pair of rollers 30 and an initial drawing speed by the clamp device 30 are as follows. It is preferred that the initial sending out speed of the pair of rollers 30 and/or the initial drawing speed by the clamp device 30 are set corresponding to a difference between a thickness of the sheet-shaped resin in the molten state immediately after the extrusion and a target thickness of the sheet-shaped resin in the molten state immediately before molding by the split mold blocks 32, in a relationship with a melt index of the sheet-shaped resin in the molten state. In this case, the thermoplastic resin preferably includes one or more kinds of polyolefin resins and 5 to 40 weight parts of inorganic filler contained in this polyolefin resin, and a melt index of the thermoplastic resin at 230° C. is 1.0 to 3.0 g/10 mins.

Especially, the drawing speed by the clamp device 30 may be adjusted based on the initial drawing speed so as not to generate the draw-down in the sheet-shaped resin in the molten state until being molded by the split mold blocks 32 after being sent out by the pair of rollers 30.

Figure 8:
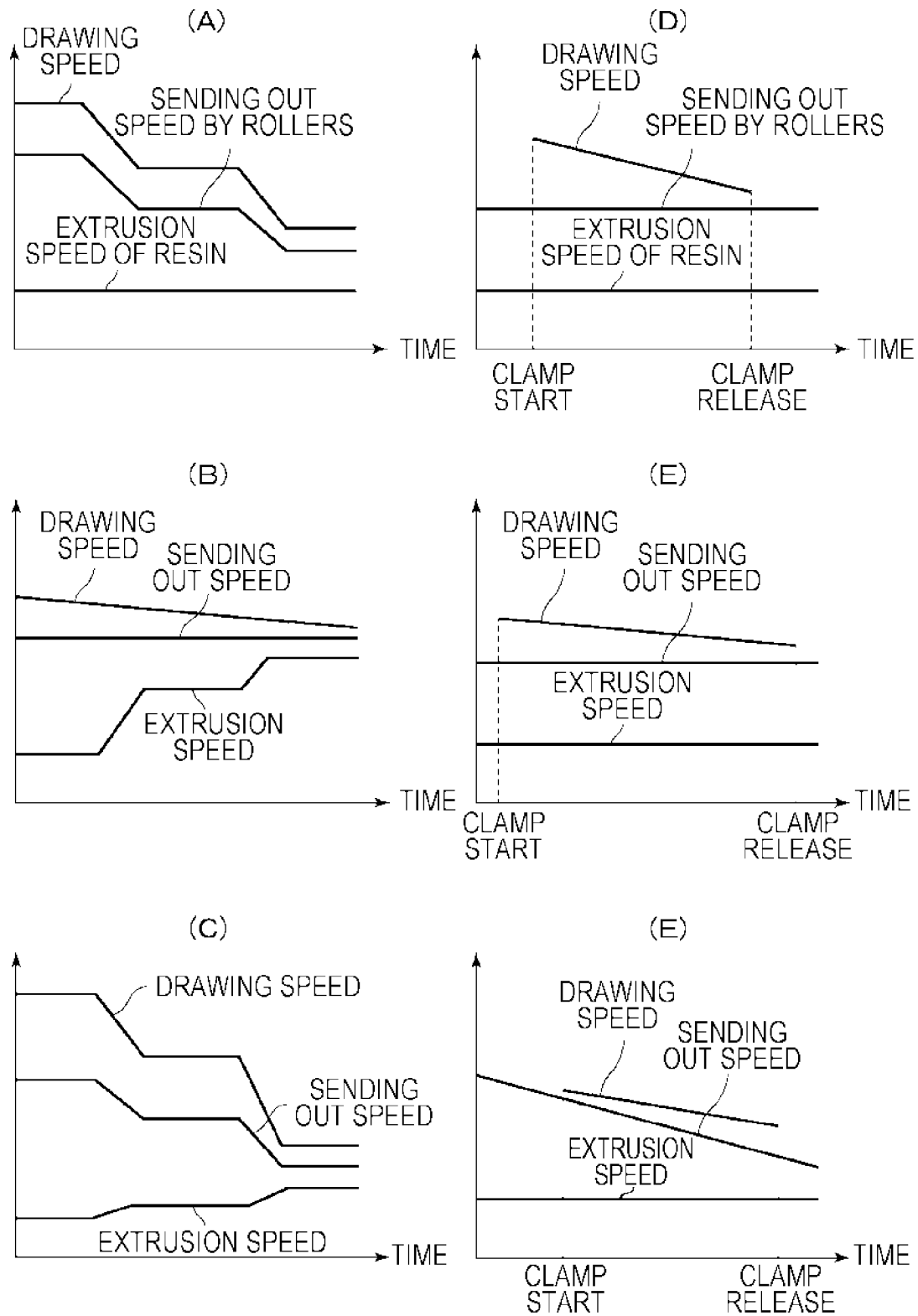
FIGS. 8(A) to (D) are simplified graphs illustrating transitions over time of extrusion speeds of the sheet-shaped resin, rotation speeds of the rollers, and drawing speeds by a clamp in the molding apparatus for the resin molded article according to the first example of the present invention.

For example, as illustrated in FIG. 8(A), while the extrusion speed of the sheet-shaped thermoplastic resin is set to constant, the rotation speed of the rollers (sending out speed) and the driving speed (drawing speed) of the clamp portion by the arm drive unit may be each reduced in phases with a lapse of time. As illustrated in FIG. 8(B), while the rotation speed of the rollers is set to constant, the extrusion speed of the sheet-shaped thermoplastic resin and the driving speed of the clamp portion by the arm drive unit may be each reduced in phases with a lapse of time. Alternatively, as illustrated in FIG. 8(C), the driving speed of the clamp portion is set to be in a range greater than the rotation speed of the rollers, and the driving speed of the clamp portion, the rotation speed of the rollers, and the extrusion speed of the sheet-shaped thermoplastic resin may be varied in phases with a lapse of time.

In any case, a relative speed difference between the downward sending out speed of the sheet-shaped resin by the rotation of the pair of rollers 30 and the extrusion speed of the sheet-shaped resin is decreased with a lapse of time. Furthermore, a relative speed difference between the downward sending out speed of the sheet-shaped resin by the rotation of the pair of rollers 30 and the downward drawing speed of the sheet-shaped resin by the arm drive unit is decreased. In view of this, the upper the portion of the sheet-shaped resin, the less the downward tensile force by the pair of rollers 30 gets. Thus, the stretching and thinning in association with such tensile force is relatively reduced. The thinning in association with the draw-down or the neck-in is cancelled out and the draw-down or the neck-in is effectively prevented. As a result, forming a uniform thickness in the extruding direction is possible.

In this case, as a modification, the adjustment of the interval of the extrusion slit 34 and the adjustment of the rotation speed of the rollers and the driving speed of the clamp portion may be coordinated. More specifically, while decreasing the downward sending out speed of the sheet-shaped resin by the pair of rollers 30 by decreasing the rotation speed of the rollers with a lapse of time, the downward drawing speed of the sheet-shaped resin by the clamp portion may be decreased by decreasing the driving speed of the clamp portion and the interval of the extrusion slit 34 may be widened using the slit clearance adjusting device 42 and/or 44. This thickens the thickness of the sheet-shaped resin extruded downward from the extrusion slit 34 with a lapse of time in a step of the primary molding. Simultaneously with this, a stretching and thinning effect to the sheet-shaped resin by the pair of rollers 30 and the clamp portion is reduced. In view of this, the upper the portion of the sheet-shaped resin, the more effectively the draw-down or the neck-in can be prevented due to a synergistic effect of a thickening of the sheet-shaped resin and a reduction of the stretching and thinning effect to the sheet-shaped resin.

Especially, as illustrated in FIGS. 8(B) and 8(C), when the extrusion speed of the sheet-shaped resin is varied during molding of the sheet-shaped resin, it is usually required to vary the extrusion amount of the molten resin by the plunger 26 per unit time. Varying the extrusion amount of the molten resin has an effect on swelling of the molten resin immediately after being extruded from the extrusion slit 34. Hence, it is preferred that the adjustment of the interval of the extrusion slit 34 is performed in parallel with the adjustment of the rotation speed of the rollers and the driving speed of the clamp portion in order to prevent the effect of thickening of the sheet-shaped resin in association with such swelling.

More specifically, the more the extrusion amount per unit time increases, the shorter a molding period from the start of the primary molding to the termination of the secondary molding becomes. This improves a molding efficiency. Furthermore, shortening a period in which the sheet-shaped resin is drooping before the secondary molding ensures reduced possibility of the draw-down or the neck-in generation. However, on the other hand, the more the extrusion amount per unit time increases, the more the swelling of the sheet-shaped resin extruded from the extrusion slit 34 is accelerated. Corresponding to the thickening in association with this swelling, there possibly is a necessity of the adjustment of the interval between the pair of rollers 30 and/or the driving speed of the clamp portion. In this respect, adjusting the thickening itself of the sheet-shaped resin due to the swelling by adjusting the interval of the extrusion slit 34 is technically advantageous.

In this case, solely performing only the adjustment of the interval of the extrusion slit 34 can adjust the thickness of the sheet-shaped resin that is extruded. However, adjusting the thickness of the sheet-shaped resin by the adjustment of the rotation speed of the pair of rollers 30 and/or the driving speed of the clamp portion is technically further advantageous in the following points.

A first point is that the adjustment of the rotation speed of the pair of rollers 30 and/or the driving speed of the clamp portion allows an easy adjustment of the thickness of the sheet-shaped resin compared with the adjustment of the interval of the extrusion slit 34. More specifically, when the extrusion amount of the molten resin per unit time is constant, the narrower the interval of the extrusion slit 34 is, the more the swelling of the sheet-shaped resin is reduced, but the higher an extruding pressure becomes, thereby accelerating the swelling of the sheet-shaped resin. In view of this, it is difficult to adjust the thickness of the sheet-shaped resin immediately after being extruded from the extrusion slit 34 to the desired thickness. The interval of the extrusion slit 34 is needed to be determined through the trial and error at the field. Furthermore, it is difficult to adjust the thickness after the swelling by varying the interval of the extrusion slit 34 during the molding.

A second point is that the adjustment of the rotation speed of the pair of rollers 30 and/or the driving speed of the clamp portion is superior to the adjustment of the interval of the extrusion slit 34 in responsiveness to the thickness of the sheet-shaped resin. More specifically, when the interval of the extrusion slit 34 is varied, it takes time until the thickness of the sheet-shaped resin immediately after being extruded from the extrusion slit 34 reaches a steady state. Therefore, a portion of the sheet-shaped resin immediately after the extrusion cannot be used for the secondary molding, thus causing a reduced yield rate. In contrast, when the rotation speed of the pair of rollers 30 is adjusted, the downward sending out speed of the sheet-shaped resin sandwiched between the pair of rollers is varied in association with a variation of the rotation speed. Thereby, the tensile force of the sheet-shaped resin by the pair of rollers varies and the sheet-shaped resin is stretched and thinned. Hence, the adjustment of the rotation speed of the pair of rollers 30 is excellent in responsiveness to the thickness of the sheet-shaped resin and can restrain the reduced yield rate.

A third point is that the adjustment of the rotation speed of the pair of rollers 30 and/or the driving speed of the clamp portion can adjust the thickness of the sheet-shaped resin immediately before the mold clamping by the secondary molding better than the adjustment of the adjustment of the interval of the extrusion slit 34. More specifically, the thickness of the sheet-shaped resin before the mold clamping being non-uniform in the extruding direction due to the draw-down or the neck-in adversely affects a forming operation by the blow molding or the vacuum molding. In view of this, it is more preferred to ensure a uniformity of the thickness of the sheet-shaped resin immediately before the mold clamping of the mold. In this respect, it is advantageous to adjust the thickness between the primary molding by extruding and the secondary molding by the blow molding or the vacuum molding.

In FIGS. 8(D) to 8(F), a period from the start of clamping to the release of clamping, that is, a period for the clamp device 300 drawing the sheet-shaped resin in the molten state, and a way the drawing speed changes are each different.

In more details, in FIGS. 8(D) and 8(E), while the extrusion speed of the sheet-shaped resin in the molten state and the sending out speed of the sheet-shaped resin in the molten state by the pair of rollers are made constant, the drawing speed by the clamp device 300 is reduced with a lapse of time. In contrast, in FIG. 8(F), while the extrusion speed of the sheet-shaped resin in the molten state is made constant, the sending out speed of the sheet-shaped resin in the molten state by the pair of rollers and the drawing speed by the clamp device 300 are reduced with a lapse of time.

As can be seen by comparing FIGS. 8(D) and 8(E), in FIG. 8(D), while the period of drawing is short, the initial drawing speed is fast, thereby a drawing speed reduction rate until the release of clamping is sharp. Meanwhile, in FIG. 8(E), while the period of drawing is long, the initial drawing speed is slow, thereby the drawing speed reduction rate until the release of clamping is gentle.

In contrast, in FIG. 8(F), while timings of the start of clamping and the release of clamping is late, the period of drawing is identical, compared with FIG. 8(D). In FIG. 8(F), a speed difference between the drawing speed by the clamp device 300 and the sending out speed by the pair of rollers is different from FIGS. 8(D) and 8(E) and increases with a lapse of time.

Selection of any one of FIGS. 8(D) to 8(F) may be simply determined from a perspective of determining a stretching aspect for the sheet-shaped resin corresponding to a physical property of the sheet-shaped resin as the molding target, especially the melt index, the MFR, and the melt tension. As a modification, the initial sending out speed by the pair of rollers 30 may be set to the maximum in a range where the sheet-shaped resin in the molten state is not torn by the first stretching. Furthermore, the initial drawing speed of the clamp device 300 may be set to the maximum in a range where the sheet-shaped resin in the molten state is not torn by the second stretching. Furthermore, the drawing speed by the clamp device 300 may be adjusted based on the initial drawing speed such that the draw-down is not generated in the sheet-shaped resin in the molten state until the sheet-shaped resin in the molten state is molded by the split mold blocks 32 after the sending out by the pair of rollers 30.

Figure 6:
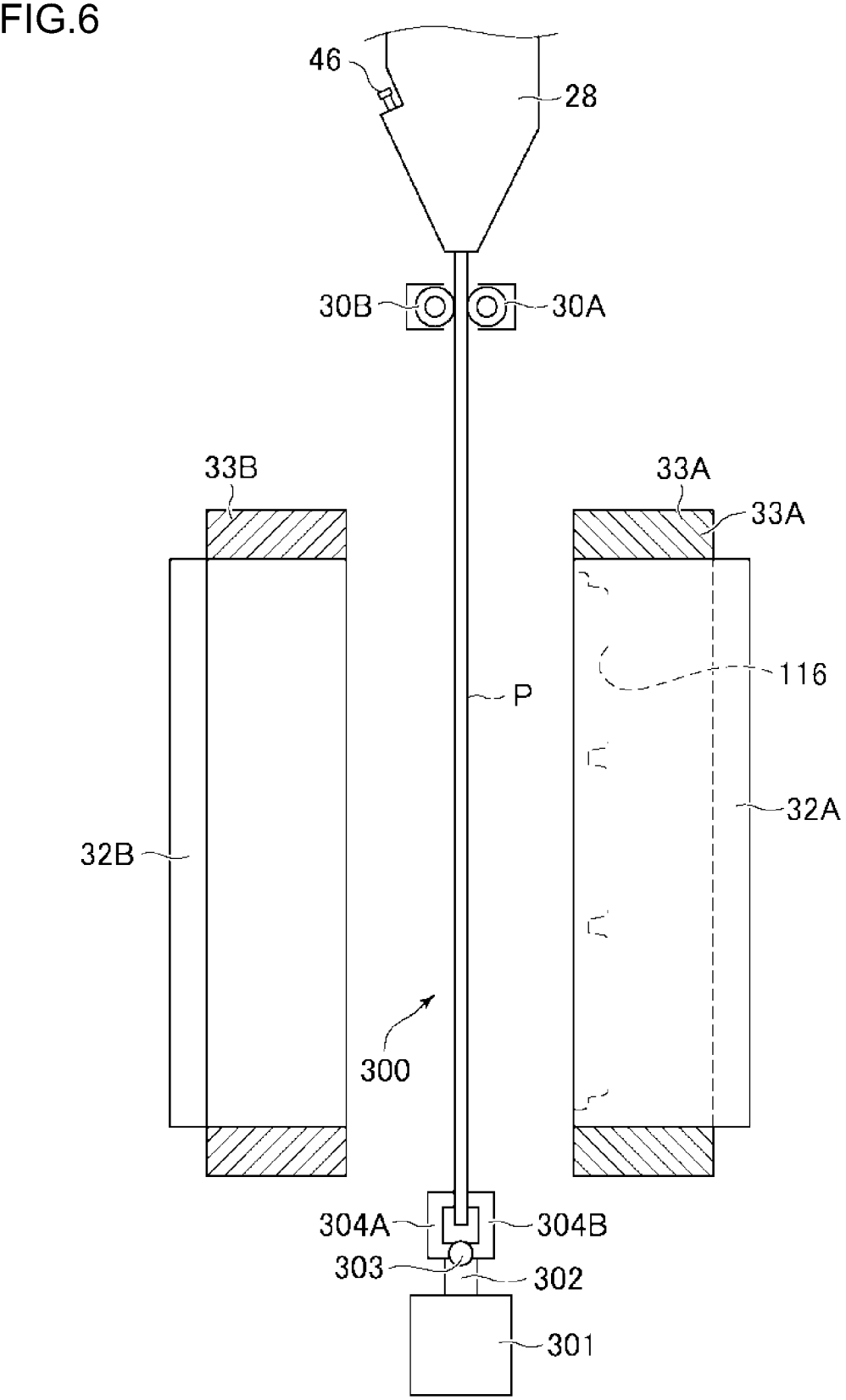
FIG. 6 is a schematic side view of a state where the sheet-shaped resin is disposed between split mold blocks in the molding apparatus for the resin molded article according to the first example of the present invention.

Next, as illustrated in FIG. 6, the clamp portion 304 releases clamping of the sheet-shaped resin in a state where the clamp portion 304 is at the clamp release level (PL). This results in disposing the sheet-shaped resin that is formed to have a uniform thickness in the extruding direction between the split mold blocks 32 disposed below the pair of rollers 30.

Next, as illustrated in FIG. 7, at a time point where the extrusion of the predetermined amount of sheet-shaped resin is completed, the split mold blocks 32 are mold-clamped and suctioning from the vacuum suction chamber 120 via the suction holes 122 is performed. This pressurizes and/or depressurizes an air between the sheet-shaped resin and the split mold blocks 32. This molds the sheet-shaped resin into a shape conforming to the mold shape. This ensures molding the resin molded article having a desired thickness in the extruding direction without adversely affecting the forming in the secondary molding.

Figure 9:
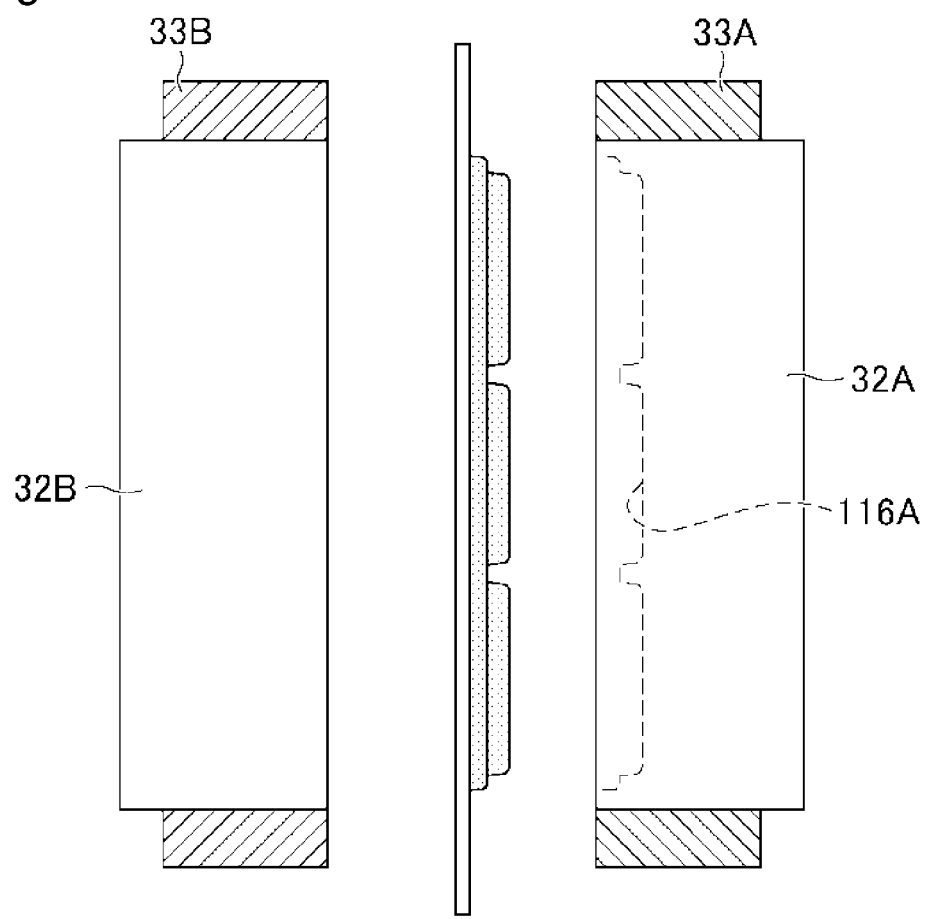
FIG. 9 is a schematic side view of a state where the split mold blocks are mold-opened in the molding apparatus for the resin molded article according to the first example of the present invention.

Next, as illustrated in FIG. 9, the split mold blocks 32 are mold-opened to take out the molded resin molded article, and burrs formed around a parting line are removed. This completes the secondary molding.

Each time the molten resin is intermittently extruded in the primary molding, the above-mentioned operations are repeated. This ensures molding the sheet-shaped resin molded article one after another.

As described above, intermittently extruding the thermoplastic resin as the sheet-shaped resin in the molten state by the primary molding (extrusion molding) and molding the sheet-shaped resin extruded by the secondary molding (blow molding or vacuum molding) using the mold are possible.

In the present invention, after the resin sheet in the molten state is sent out by the pair of rollers, the resin sheet in the molten state is drawn by the clamp. With this, a technical drawback caused by the pair of rollers sending out the resin sheet in the molten state is compensated by the clamp drawing the resin sheet in the molten state. Furthermore, a technical drawback caused by the clamp drawing the resin sheet in the molten state is compensated by the pair of rollers sending out the resin sheet in the molten state. This achieves a technical synergistic effect brought by the combination of the pair of rollers sending out the resin sheet in the molten state and the clamp drawing the resin sheet in the molten state.

More specifically, suppose that thinning of the resin sheet in the molten state is performed only by the pair of rollers sending out the resin sheet in the molten state. In this case, there is a limitation in restraining the draw-down that is generated by the resin sheet's own weight with a progress of sending out by the adjustment of the rotation speed of the pair of rollers, that is, the sending out speed. The resin sheet sent out from the pair of rollers can only be thinned within a range considering the resin sheet is pulled and stretched by its own weight without being adjusted afterwards. That is, a tear of the resin sheet in the molten state can be generated depending on a length (weight) of the resin sheet in the molten state drooping from the pair of rollers. In view of this, it has been necessary to determine the thickness of the resin sheet in a range considering the draw-down. On the other hand, performing drawing of the lower end portion of the resin sheet in the molten state by the clamp after the resin sheet in the molten state is sent out by the pair of rollers ensures uniformly loading a tensile force to a whole portion of the resin sheet in the molten state that droops from the pair of rollers. Thereby, a uniform stretching effect can be applied over the whole portion of the resin sheet in the molten state that droops from the pair of rollers. This restrains the draw-down. Furthermore, an active drawing by the clamp ensures adjusting the thickness of the resin sheet such that a sufficient thinning is achievable at a timing immediately before molding the resin sheet.

On the other hand, suppose that thinning of the resin sheet in the molten state is performed only by the clamp drawing the resin sheet in the molten state. In this case, speeding up the drawing speed possibly tears the resin sheet in the molten state. On the other hand, speeding up the sending out speed of the resin sheet in the molten state by the pair of rollers is less likely to generate the tear of the resin sheet in the molten state between the extrusion slit and the pair of rollers because the interval between the extrusion slit and the pair of rollers is short.

Accordingly, a collaboration of the stretching of the sheet-shaped resin by the pair of rollers and the stretching of the sheet-shaped resin by the drawing ensures an achievement of the desired thickness of the sheet-shaped resin in the molten state in molding by the mold and also restraining a neck-in phenomenon from occurring due to an increase of the sending out speed. As a result, a synergistic effect of an improvement in thinning the sheet-shaped resin in the molten state due to the increase of the sending out speed of the rollers and the thinning of the sheet-shaped resin in the molten state by drawing ensures further thinning of the sheet-shaped resin in the molten state. Furthermore, an improvement of the rotation speed of the rollers ensures a reduced cooling effect by the rollers to the sheet-shaped resin in the molten state. This, coupled with the prevention of the neck-in phenomenon from occurring, ensures maintaining a satisfactory formability.

As described above, with respect to the target thickness of the resin sheet in the molten state, stretching by the pair of rollers sending out the resin sheet in the molten state mainly thins the resin sheet in the molten state. Stretching by the clamp drawing the resin sheet in the molten state after the pair of rollers sending out the resin sheet in the molten state secondarily (supplementarily) thins the resin sheet in the molten state. As a result, a difficulty in a thickness adjustment of the resin sheet and a limitation of thinning due to the draw-down are improved and the resin sheet in the molten state immediately before molding reliably becomes the target thickness.

The following describes another example of the present invention with reference to FIGS. 10 to 15. In the following description, a component similar to that of the previous example is attached with a similar reference number, and its explanation is omitted. The following describes characterizing portions of this example in details.

The resin molded article, in the previous example, is a solid single sheet-shaped molded article, and, in contrast in this example, is a molded article with a hollow portion using two strips of sheet-shaped resins.

Concerning this example, thermoplastic resins in molten states are extruded into sheet shapes in forms of drooping downward from the extrusion slits 34 of the T-dies 28 in a primary molding. In a secondary molding, using the sheet-shaped resins extruded downward, the resin molded article is molded by the vacuum molding through the mold clamping of the split mold blocks 32. These points are common to the above example. In this example, the two strips of sheet-shaped resins are simultaneously molded. Then, for each of the sheet-shaped resins, the thermoplastic resin in the molten state is extruded into the sheet shape in the form of drooping downward from the extrusion slit 34 of the T-die 28. Furthermore, in the secondary molding, using the two strips of sheet-shaped resins extruded downward, the resin molded article is molded by the vacuum molding through the mold clamping of the split mold blocks 32. These points are different from the previous example.

Figure 10:
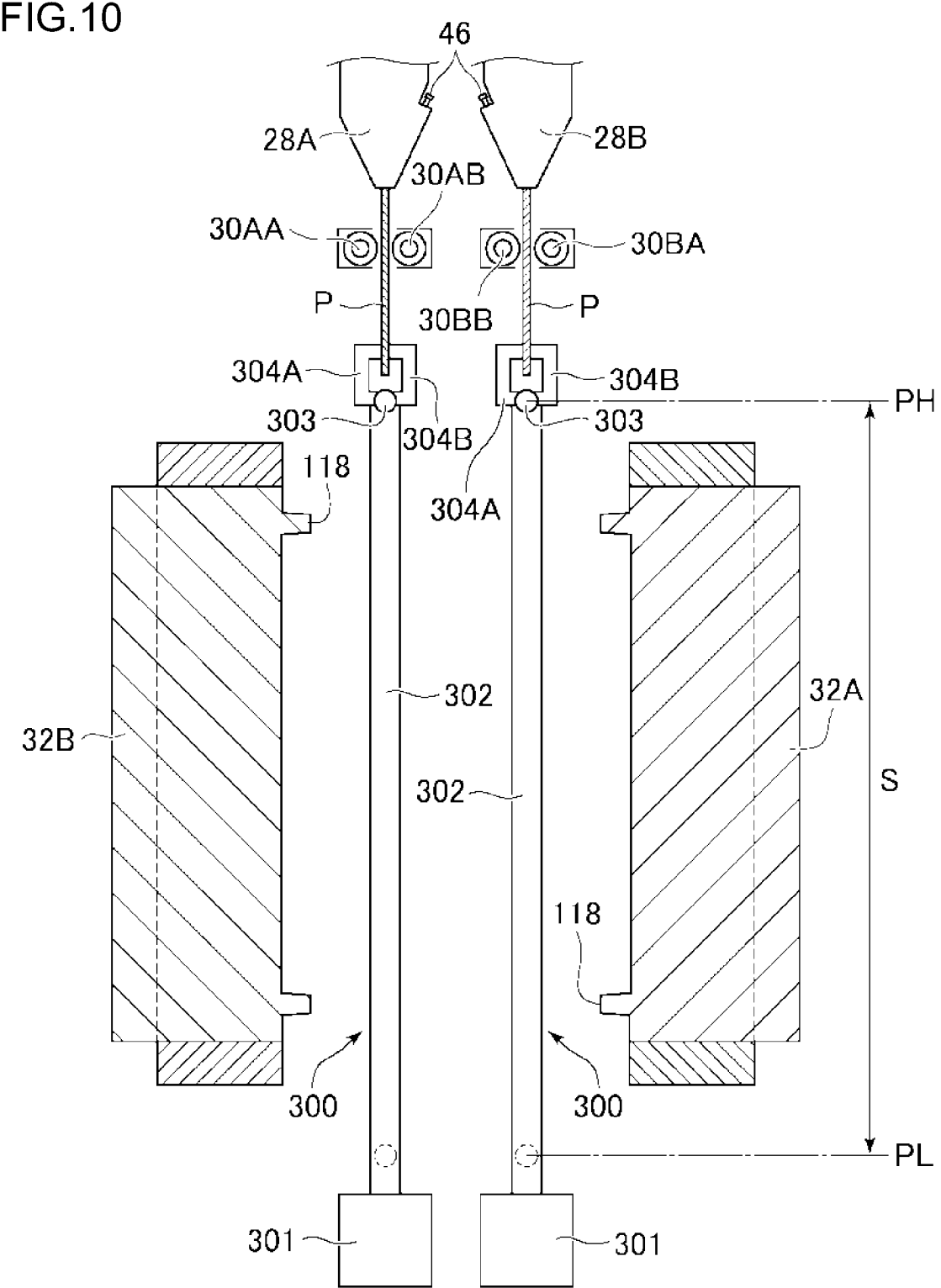
FIG. 10 is a drawing similar to FIG. 5 of a molding apparatus for a resin molded article according to a second example of the present invention.
Figure 11:
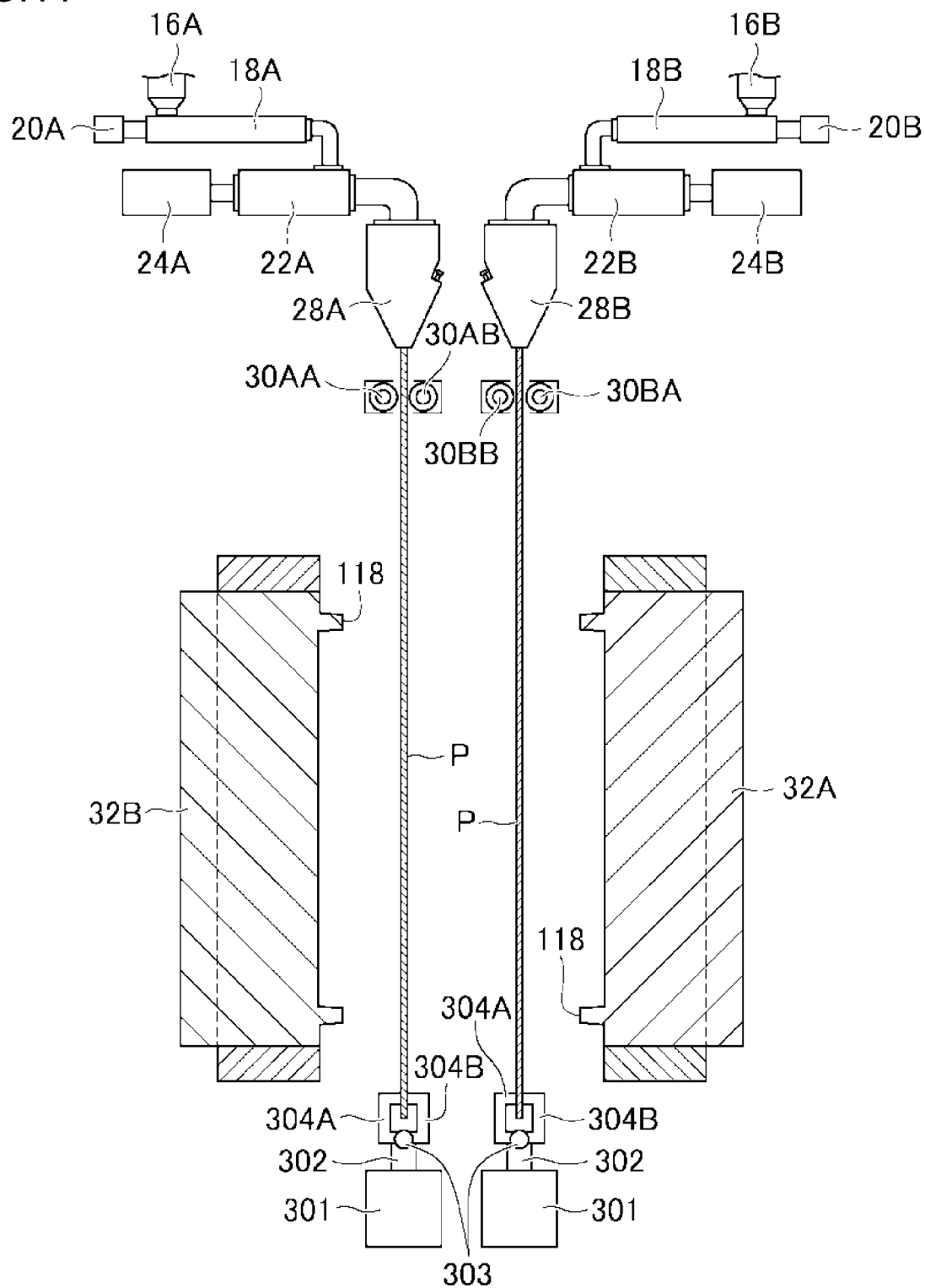
FIG. 11 is a drawing similar to FIG. 6 of the molding apparatus for the resin molded article according to the second example of the present invention.

As illustrated in FIGS. 10 and 11, for each of the primary moldings of the two strips of sheet-shaped resins, similarly to the previous example, a relative speed difference between an extrusion speed and a sending out speed of the sheet-shaped resin sent out downward by the pair of rollers 30 is adjusted corresponding to the extrusion speed of each of the sheet-shaped resins by adjusting a rotation speed of the pair of rollers 30. Furthermore, a relative speed difference between the sending out speed by the pair of rollers 30 and a downward drawing speed by the clamp portion 304 is adjusted by adjusting a driving speed of the arm drive unit 301. As a result, the sheet-shaped resin is pulled downward (the first stretching) by the pair of rollers 30 and pulled downward (the second stretching) by the clamp portion when the sheet-shaped resin passes through between the pair of rollers 30. Thereby, the sheet-shaped resin is stretched and thinned. As a result, the generation of the draw-down or the neck-in is effectively prevented. An adjustment of the interval of the extrusion slit 34 may be performed in conjunction with an adjustment of the number of rotations of the pair of rollers 30 and the driving speed of the arm drive unit 301.

In this case, in a period from a step of extruding a first thermoplastic resin and/or a second thermoplastic tree to a step of molding the resin molded article, it is preferred that there is a step of adjusting a first predetermined drawing speed corresponding to a change of a first predetermined sending out speed or a step of adjusting a second predetermined drawing speed corresponding to a change of a second predetermined sending out speed.

Concerning the secondary molding, first, as illustrated in FIG. 11, each of the two strips of sheet-shaped resins is arranged between the split mold blocks 32A and B.

Figure 12:
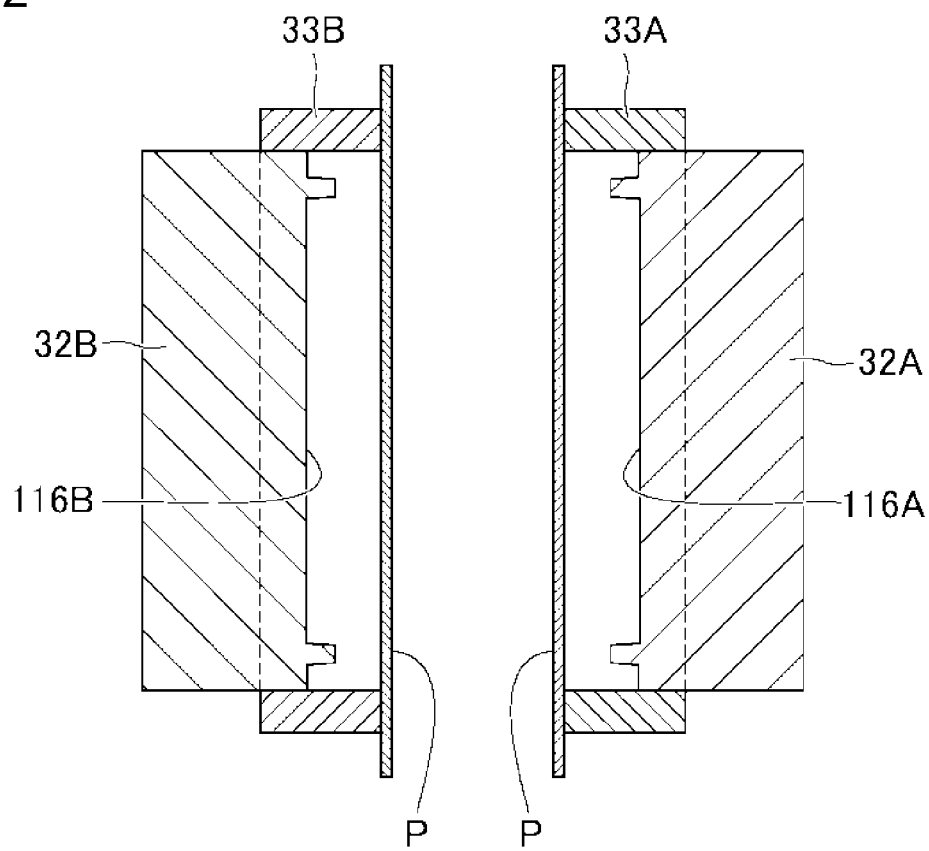
FIG. 12 is a schematic side view of a state where two strips of sheet-shaped resins are suctioned by split mold blocks in the molding apparatus for the resin molded article according to the second example of the present invention.

Next, as illustrated in FIG. 12, the respective frames 33A and B of the split mold blocks 32A and B move toward the corresponding one of the two strips of sheet-shaped resins with respect to the corresponding split mold blocks and come in contact with side surfaces of the two strips of sheet-shaped resins. This forms sealed spaces by the respective sheet-shaped resins, the corresponding frames 33 and cavities 116.

Figure 13:
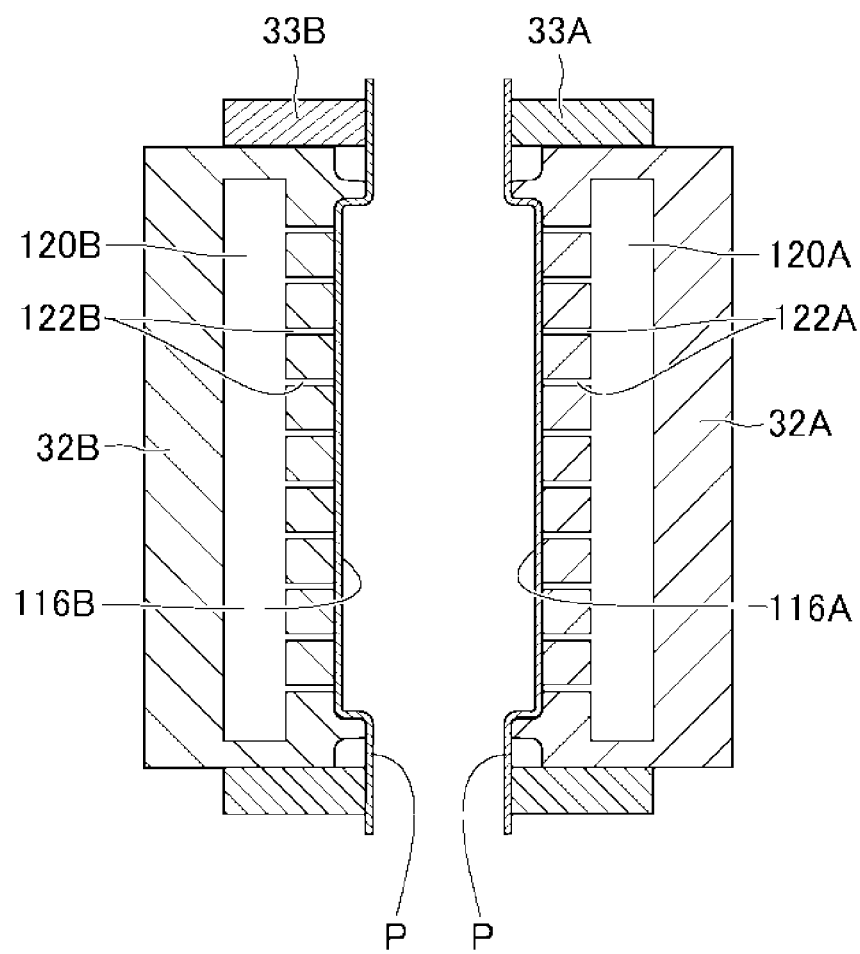
FIG. 13 is a schematic side view of a state where each of the two strips of sheet-shaped resins are vacuum molded by the split mold blocks in the molding apparatus for the resin molded article according to the second example of the present invention.

Next, as illustrated in FIG. 13, air within the sealed spaces is suctioned from the vacuum suction chambers 120 via the suction holes 122. This causes the respective two strips of sheet-shaped resins to be attracted to the corresponding cavities 116. Thereby, the respective two strips of sheet-shaped resins are formed into shapes conforming to surfaces of the corresponding cavities 116. In this case, the two strips of sheet-shaped resins before the suction have uniform thicknesses in the vertical direction. Hence, it is possible to prevent a situation in which the forming operation is not satisfactorily performed due to a thickness distribution caused by a blow ratio.

Figure 14:
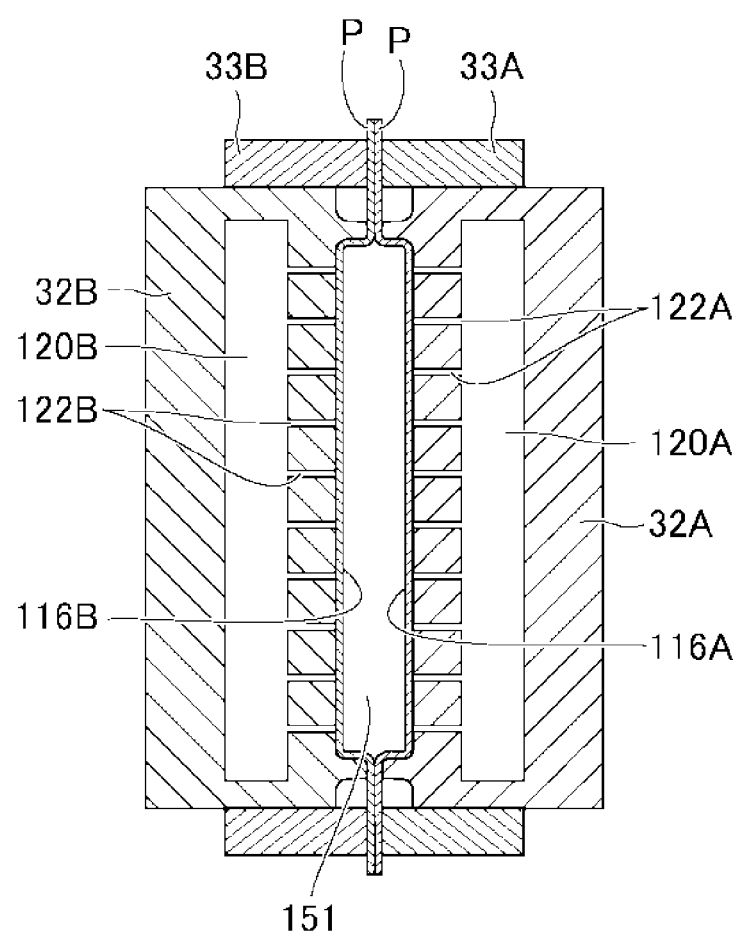
FIG. 14 is a schematic side view of a state where the split mold blocks are mold-clamped in the molding apparatus for the resin molded article according to the second example of the present invention.

Next, as illustrated in FIG. 14, the frames 33A and B and the split mold blocks 32A and B are integrally moved to come close to one another. This mold clamps the split mold blocks 32A and B, and the respective pinch-off parts of the split mold blocks 32A and B weld peripheral edge portions of the two strips of sheet-shaped resins to one another. This forms a hermetic hollow portion 151 inside the two strips of sheet-shaped resins.

Figure 15:
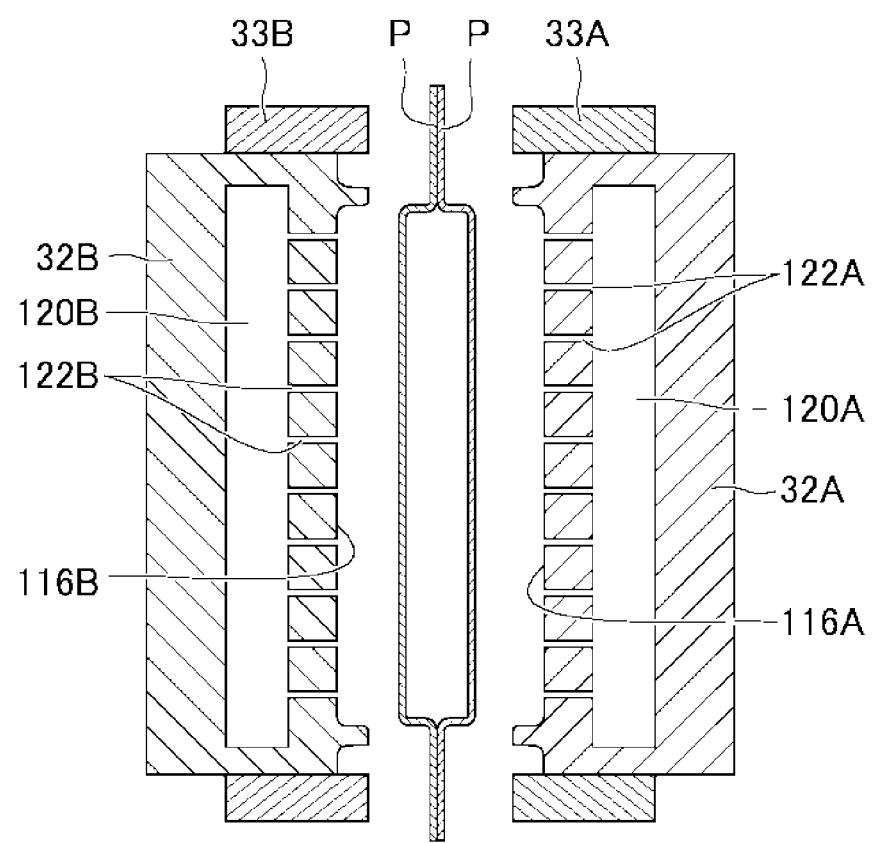
FIG. 15 is a schematic side view of a state where the split mold blocks are mold-opened in the molding apparatus for the resin molded article according to the second example of the present invention.

Next, as illustrated in FIG. 15, the frames 33A and B and the split mold blocks 32A and B are integrally moved away from one another. This mold-opens the split mold blocks 32A and B. The molded resin molded article is taken out and burrs on an outer periphery portion are removed. Then, the secondary molding completes.

As is conventionally done, molding a resin molded article having a hollow portion using a tubular-shaped parison is technically difficult to mold a molded article having a uniform thickness because of the blow ratio. According to this example, the two strips of sheet-shaped resins have the peripheral edge portions welded to one another by the secondary molding using the two strips of sheet-shaped resins having the uniform thicknesses. This ensures molding the molded article with the hollow portion that has the uniform thickness.

As described above, according to this example, when the resin molded article internally having the hollow portion is molded using the two strips of sheet-shaped resins, the thickness of each of the sheet-shaped resins in the extruding direction is made uniform before the secondary molding through the adjustment of the number of rotations of the pair of rollers 30. This ensures molding each of the sheet-shaped resins into a sheet shape having a desired thickness by the secondary molding without adversely affecting the forming of the secondary molding. Hence, when the resin molded article internally having the hollow portion is molded using such two strips of sheet-shaped resins by mold-clamping the mold to weld the peripheral edges of the sheet-shaped resins with one another, it is possible to reliably weld the peripheral edges of the sheet-shaped resins, and thereby ensuring obtaining a resin molded article having a sufficient strength despite the resin molded article internally having a hollow portion.

The following describes a further example of the present invention with reference to FIGS. 16 to 25. In the following description, a component similar to that of the above example is attached with a similar reference number, and its explanation is omitted. The following describes characterizing portions of this example in details.

The resin molded article, in the second example, is a molded article having a hollow portion using the two strips of sheet-shaped resins. In contrast, a resin molded article in this example is a sandwich panel molded article in which a reinforcing core material is disposed in a hollow portion.

In this example, two strips of sheet-shaped resins are molded in a primary molding. Then, for each of the sheet-shaped resins, a thermoplastic resin in a molten state is extruded into a sheet shape in a form of drooping downward from the extrusion slit 34 of the T-die 28. In a secondary molding, using the two strips of sheet-shaped resins extruded downward, the resin molded article is molded by the blow molding or the vacuum molding through the mold clamping of the split mold blocks 32. These points are common to the above example. In the previous example, a hermetic hollow portion is formed inside the two strips of sheet-shaped resins in relation to the secondary molding. In contrast to this, in this example, the reinforcing core material that is additionally molded is disposed within such hermetic hollow portion to form a sandwich panel sandwiching the reinforcing core material with the two strips of sheet-shaped resins. This point is a different point.

Concerning a molding apparatus of the sandwich panel, a pair of framing members 128A and B are disposed approximately parallel to the cavities 116 between the split mold blocks 32A and B in a nesting manner with the pair of molds 32A and B. The pair of framing members 128A and B include respective openings 130A and B. A framing member driving device (not illustrated) moves the pair of framing members 128A and B in a horizontal direction. This ensures the pair of framing members 128A and B being each moved toward the corresponding sheet-shaped resin in the molten state and holding the sheet-shaped resins and being inversely moved in this state until distal ends of the pinch-off parts 118 of the corresponding molds 32A and B come in contact with surfaces of the sheet-shaped resins through the openings 130.

In this example, materials for a reinforcing core material 150 include the following thermoplastic resins. These thermoplastic resins include polyolefin (such as polypropylene and high-density polyethylene) that is homopolymer or copolymer of olefins, such as ethylene, propylene, butane, isoprene pentene, and methyl pentene; polyamide; polystyrene; polyvinyl chloride; polyacrylonitrile; acrylic derivative, such as ethylene-ethyl acrylate copolymer; polycarbonate; vinyl acetate copolymer, such as ethylene-vinyl acetate copolymer; ionomer; terpolymer, such as ethylene-propylene-dienes; ABS resin; polyolefin oxide; polyacetal; and the like.

Among these, one kind may be solely used and two kinds or more may be mixed and used. In particular, among the thermoplastic resins, an olefin-based resin or a resin based mainly on an olefin-based resin and a polypropylene-based resin or a resin based mainly on a polypropylene-based resin are preferred in that they have an excellent balance in weldability with a fiber layer, mechanical strength, and formability. The reinforcing core material 150 may include additives. The additives include an inorganic filler, such as silica, mica, talc, calcium carbonate, glass fiber, and carbon fiber; a plasticizer; a stabilizer; a colorant; an antistatic agent; a flame retardant; a foaming agent, and the like.

The sheet-shaped resin that constitutes a skin material 160 may be common to the first example. However, especially in the case of a sandwich panel as a high strength material, securing an interval between a pair of the skin materials 160 disposed on both sides of the reinforcing core material 150, that is, a volume (thickness) of the reinforcing core material 150 secures stiffness, especially bending stiffness, as the whole sandwich panel. From this aspect, the skin material 160 is required to be at least a material that has stiffness higher than the reinforcing core material 150.

In the case where a decorative material sheet 170 is disposed on a surface of the skin material 160, the decorative material sheet 170 is constituted for a purpose of improving appearance property, decorativeness, and protecting something that contacts the molded article (in the case of a cargo floor board, for example, a luggage placed on a top surface of the board). As a material of the decorative material sheet 170, a fiber skin material sheet-shaped skin material, a film-shaped skin material, or the like are applied. As a raw material of such fiber skin material, a synthetic fiber, such as polyester, polypropylene, polyamide, polyurethane, acrylic, and vinylon; a semisynthetic fiber, such as acetate and rayon; a recycled fiber, such as viscose rayon and cuprammonium rayon; a natural fiber, such as cotton, linen, wool, and silk; or a fiber of these blend are included.

Among these, from aspects of texture, durability, and formability, polypropylene or polyester is preferred, and polyester is more preferred. As a yarn used for the fiber skin material, it is preferred to use a combination of, for example, a staple spun yarn having a fineness of 3 to 15 denier and a fiber length of approximately 2 to 5 inches, such as polyester: (3 to 5) denier×(50 to 100) mm, and a multifilament, such as a polyester including bundled thin flexible filaments: approximately 150 to 1000 denier/30 to 200 filaments=approximately 5 denier×30 to 200 or a thick monofilament, such as polyester: 400 to 800 denier/one filament.

A structure of the decorative material sheet 170 includes a nonwoven fabric, a fabric, a knit, a cloth formed by raising them, and the like. The fabric includes various varied weave that interlaces with a few yarns skipped over, besides a plain weave that has a weave structure in which a warp yarn and a weft yarn sequentially interlace under and over. Among these, the nonwoven fabric is preferred. The nonwoven fabric is easily formed into a three-dimensional shape since the nonwoven fabric does not have directionality with respect to an extension. The nonwoven fabric has excellent texture and feeling on the surface. Here, the nonwoven fabric means a fabric-like item obtained by parallely or alternately building up fibers or forming a web by randomly scattering the fibers and subsequently joining the fibers that form the web. Among these, from aspects of reproducibility of the three-dimensional shape and appearance property of the molded article, a nonwoven fabric fabricated by a needle punch method is preferred. The nonwoven fabric obtained by the needle punch method has small strength and large extensibility compared with the fabric, and has a large degree of deformation in any direction. In view of this, it is more preferred that a binder is applied on the nonwoven fabric or the web and the nonwoven fabric are stacked and punched with needles in order to achieve the improved strength as the nonwoven fabric and the stabilized dimensions. Hence, the decorative material sheet 170 is more preferred to be a polypropylene nonwoven fabric or a polyester nonwoven fabric. In this case, the decorative material sheet 170 itself is thermoplastic. In view of this, the decorative material sheet 170 can be used for another usage by being heated and deformed after separation and recovery. For example, constituting a main resin layer with the polypropylene and constituting the decorative material sheet 170 with the polypropylene nonwoven fabric make recycling easier because the main resin layer of the molded article and the decorative material sheet 170 are made of an identical material.

On the other hand, in the case where the decorative material sheet 170 is the polyester nonwoven fabric, a melting point of the main resin layer that is constituted of the polypropylene and a melting point of the fiber skin material are different. In view of this, when the decorative material sheet 170 is bonded to the molded article, a failure, such as a transformation and deformation by heat and inability to bond at a correct position, can be restrained from occurring. In this case, formability, stiffness, appearance, and durability are also excellent. Tensile strength of the decorative material sheet 170 is preferred to be 15 kg/cm$^2$ or more and extensibility is preferred to be 30% or more from aspects of reproducibility of the three-dimensional shape and formability. Such values of the tensile strength and the extensibility are values measured compliant to Japanese Industrial Standard K-7113 at a temperature of 20° C. As the sheet-shaped skin material and the film-shaped skin material, a thermoplastic elastomer, an embossed resin layer, a resin layer applied with a printed layer on an outer surface, a synthetic leather, a skin layer in a mesh shape for non-slipping, and the like can be used.

Next, a molding method for such a sandwich panel 10 will be described.

Figure 18:
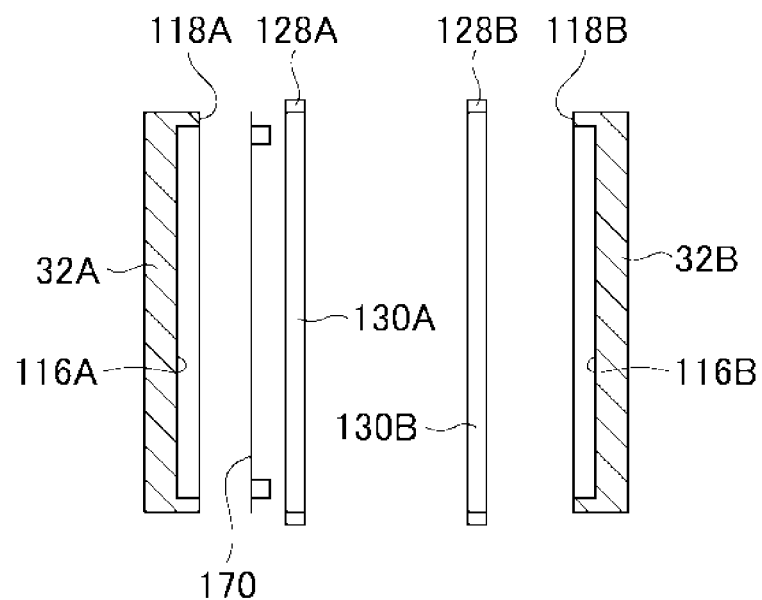
FIG. 18 is a drawing illustrating a state where a decorative material sheet is disposed between split-format molds in molding operations of the sandwich panel according to the third example of the present invention.

First, as illustrated in FIG. 18, the sheet-shaped decorative material sheet 170 is inserted between one of the split mold blocks 32 and one of the framing members 128 from a side portion of the two split mold blocks 32. The sheet-shaped decorative material sheet 170 is temporarily attached with a temporary attachment pin 303 (not illustrated) disposed in one of the split mold blocks 32 so as to cover the cavity 116 of one of the split mold blocks 32.

Figure 19:
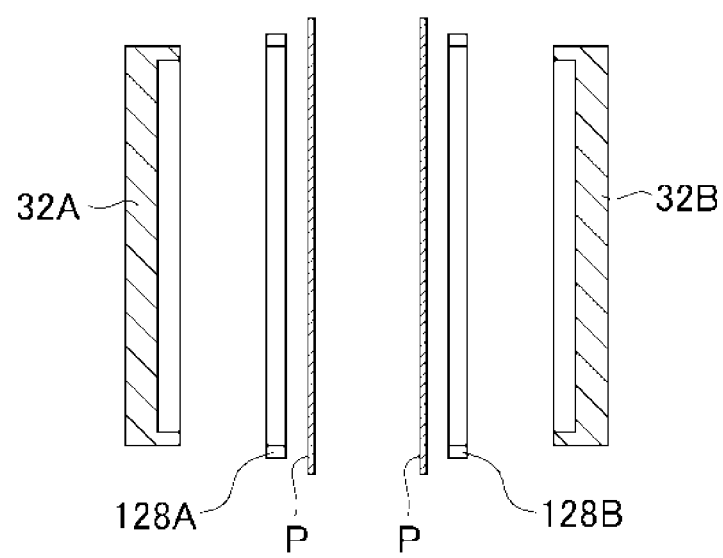
FIG. 19 is a drawing illustrating a state where skin material sheets are disposed between the split-format molds in the molding operations of the sandwich panel according to the third example of the present invention.

Next, as illustrated in FIG. 19, two strips of sheet-shaped resins in molten states are each extruded vertically downward from the respective extrusion slits 34.

Figure 16:
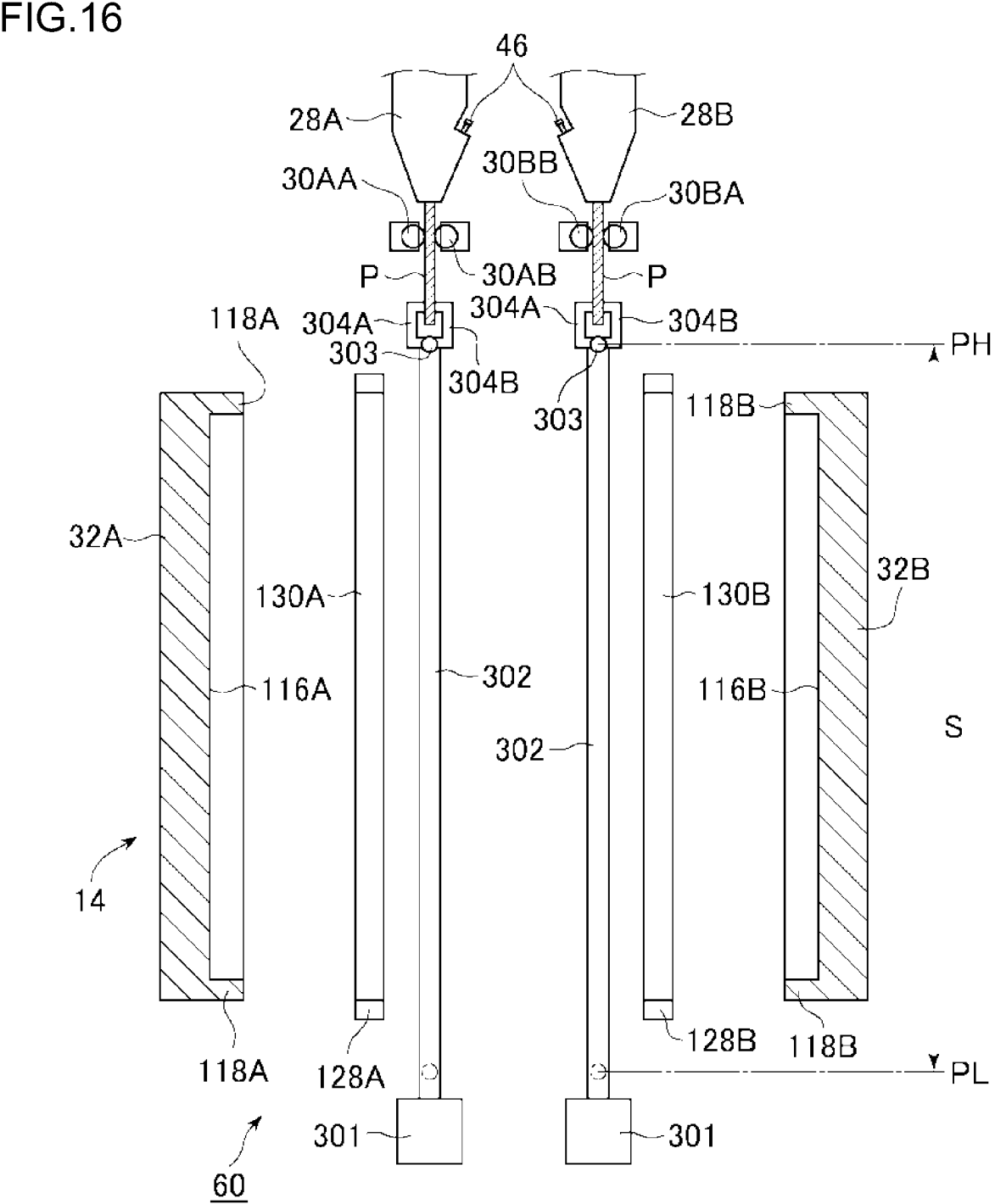
FIG. 16 is a drawing similar to FIG. 5 of a molding apparatus for a sandwich panel according to a third example of the present invention.
Figure 17:
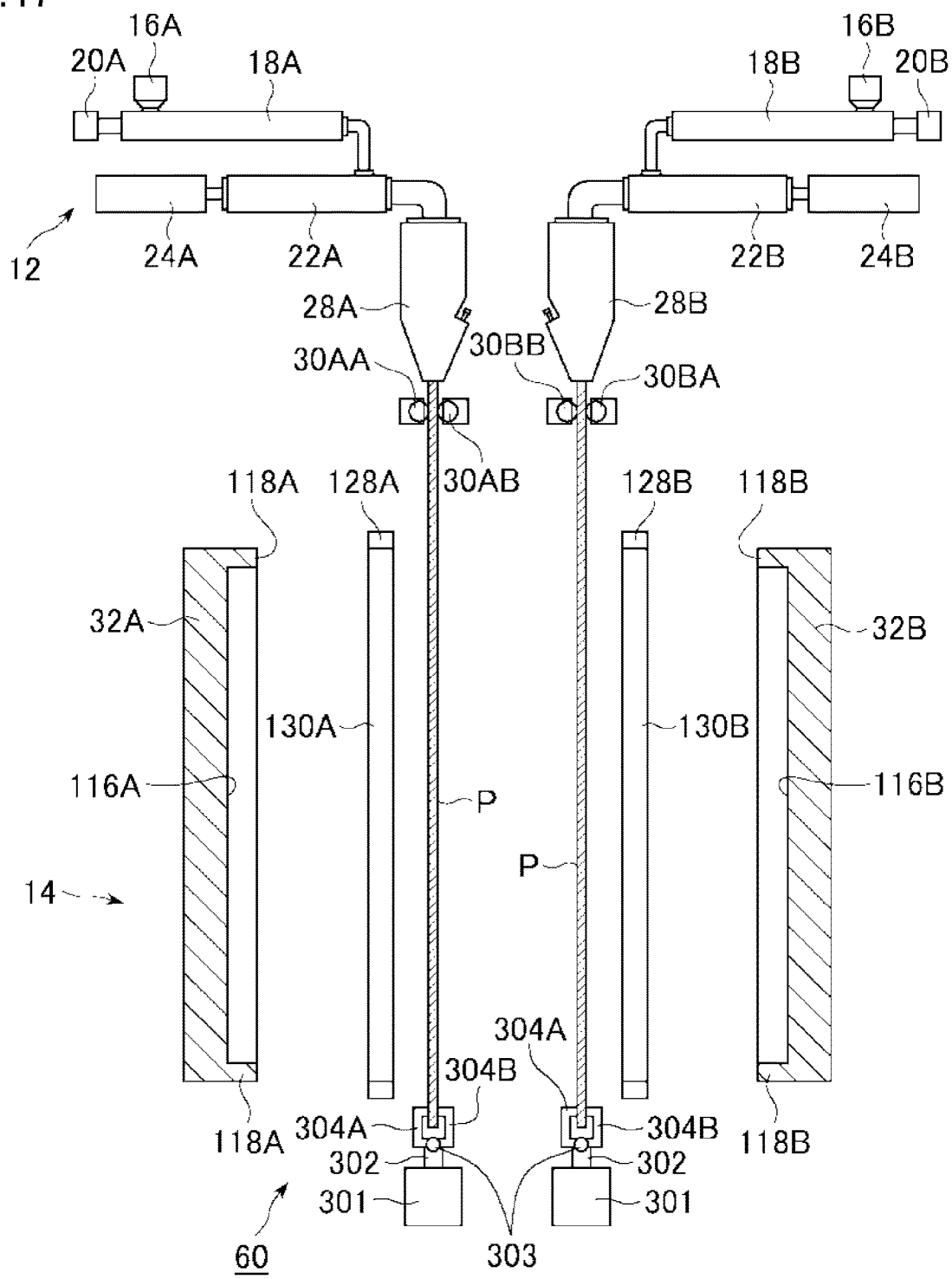
FIG. 17 is a drawing similar to FIG. 6 of the molding apparatus for the sandwich panel according to the third example of the present invention.

Then, as illustrated in FIGS. 16 and 17, similarly to the above examples a relative speed difference between an extrusion speed from the extrusion slit 34 of the sheet-shaped resin and a sending out speed of the sheet-shaped resin that is sent out downward by the pair of rollers 30 is adjusted by adjusting a rotation speed of the pair of rollers 30. Furthermore, a relative speed difference between the sending out speed by the pair of rollers 30 and a downward drawing speed by the clamp portion 304 is adjusted by adjusting a driving speed of the arm drive unit 301. As a result, the sheet-shaped resin is pulled downward by the pair of rollers 30 (the first stretching) and pulled downward by the clamp portion (the second stretching) when the sheet-shaped resin passes through between the pair of rollers 30. Thereby, the sheet-shaped resin is stretched and thinned. As a result, a generation of the draw-down or the neck-in is prevented and a uniform thickness in the extruding direction can be formed for each of the sheet-shaped resins before the mold clamping by the secondary molding. In this case, an adjustment of the interval of the extrusion slit 34 may be performed in conjunction with adjustments of the number of rotations of the pair of rollers 30 and the driving speed of the arm drive unit 301.

Next, the two strips of sheet-shaped resins are supplied between the two split mold blocks 32. Together with this, the framing member driving device moves the pair of framing members 128 toward the corresponding sheet-shaped resins.

Figure 20:
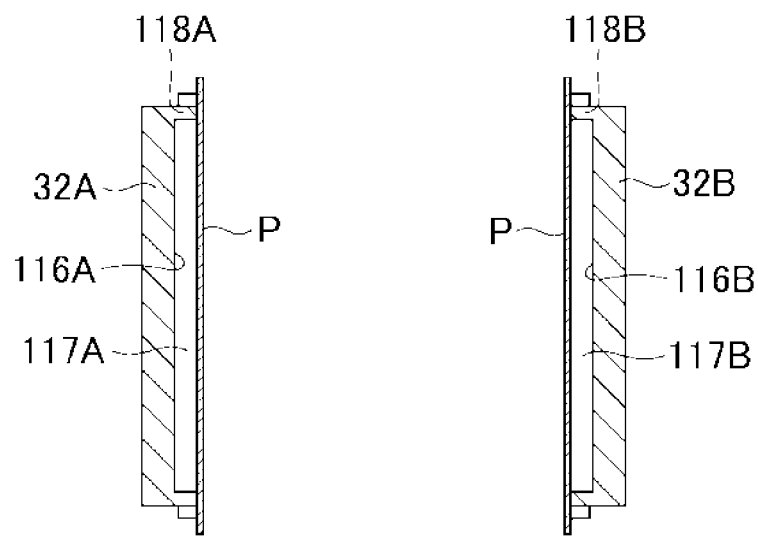
FIG. 20 is a drawing illustrating a state where the skin material sheets are in contact with the split-format molds in the molding operations of the sandwich panel according to the third example of the present invention.

Next, as illustrated in FIG. 20, the framing members 128 that hold the sheet-shaped resins are moved toward the corresponding split mold blocks 32 until the pinch-off parts 118 of the molds 32 come in contact with surfaces of the sheet-shaped resins opposing the cavities 116 through the openings 130 of the framing members 128. This forms sealed spaces by the surfaces of the sheet-shaped resins opposing the cavities 116, the pinch-off parts 118, and the cavities 116.

Figure 21:
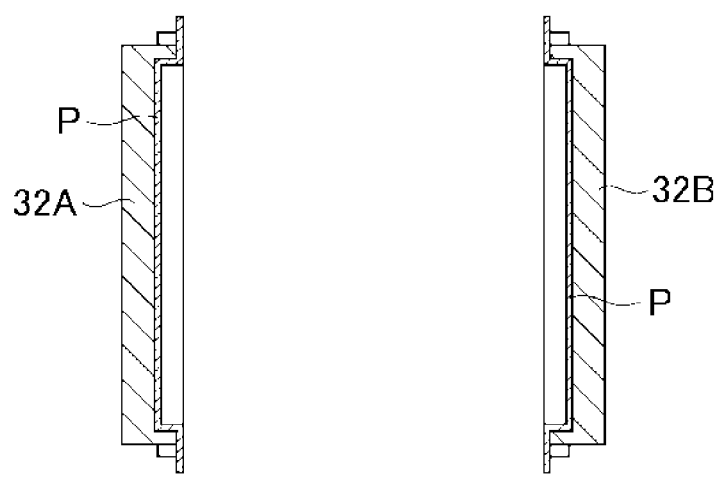
FIG. 21 is a drawing illustrating a state where the skin material sheets are formed in the molding operations of the sandwich panel according to the third example of the present invention.

Next, as illustrated in FIG. 21, insides of the sealed spaces are suctioned through the respective split mold blocks 32. Thereby, the corresponding sheet-shaped resins are applied with pressure to the cavities 116 and formed into shapes conforming to the cavities 116. The sheet-shaped resin on the left side in the drawing is formed and welded to the decorative material sheet 170 interposed between the sheet-shaped resin and the cavity 116.

Figure 22:
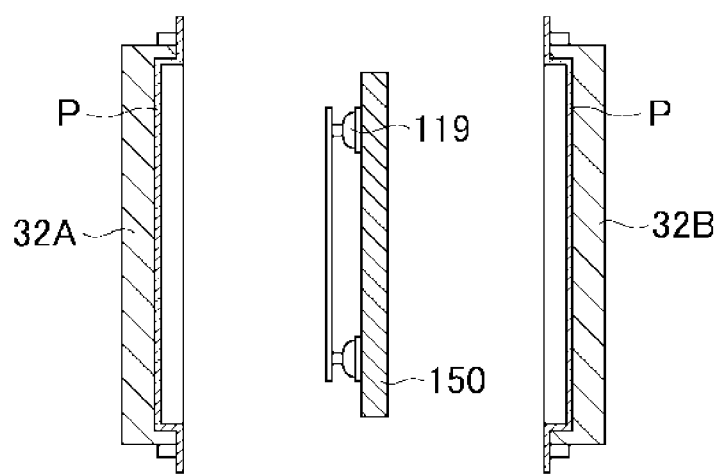
FIG. 22 is a drawing illustrating a state where a core material sheet is disposed between the split-format molds in the molding operations of the sandwich panel according to the third example of the present invention.

Next, as illustrated in FIG. 22, the reinforcing core material 150 held by suction pads 119 of a manipulator (not illustrated) are inserted between the two split mold blocks 32 from the side portion.

Figure 23:
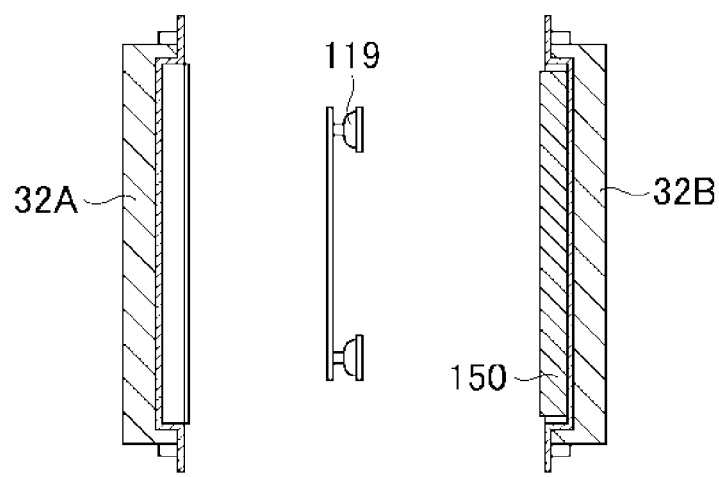
FIG. 23 is a drawing illustrating a state where the core material sheet is pressed against one of the skin material sheets in the molding operations of the sandwich panel according to the third example of the present invention.

Next, as illustrated in FIG. 23, the manipulator is moved in the horizontal direction toward the split mold block 32 on the right side. This presses the reinforcing core material 150 onto the sheet-shaped resin attracted to the cavity 116 of the split mold block 32 on the right side. This welds the reinforcing core material 150 onto the sheet-shaped resin. Next, the suction pads 119 are removed from the reinforcing core material 150, the manipulator is pulled out from between the two split mold blocks 32, and then a preparation of the mold clamping is performed.

Figure 24:
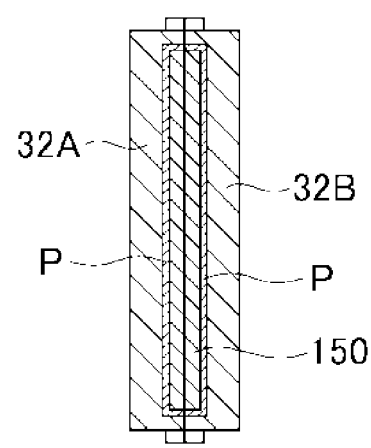
FIG. 24 is a drawing illustrating a state where the split-format molds are mold-clamped in the molding operations of the sandwich panel according to the third example of the present invention.

Next, as illustrated in FIG. 24, the mold driving device moves the two split mold blocks 32 toward a direction approaching one another from the opening position to the closed position and the two split mold blocks 32 are mold-clamped. This welds the reinforcing core material 150 welded onto one of the sheet-shaped resins (the right side in the drawing) onto the other sheet-shaped resin. Furthermore, the peripheral edges of the sheet-shaped resins are welded to one another to form the parting line PL. In mold-clamping, unlike the skin material sheet 160, the reinforcing core material 150 itself is, in a preliminarily molded state, welded onto the skin material sheet 160 in the molten state. In view of this, the reinforcing core material 150 itself is preliminarily positioned so as not to be deformed by the mold clamping.

The sandwich panel 10 laminated with the decorative material sheet 170, the skin material sheet 160, the reinforcing core material 150, and the skin material sheet 160 is completed with as described above.

Figure 25:
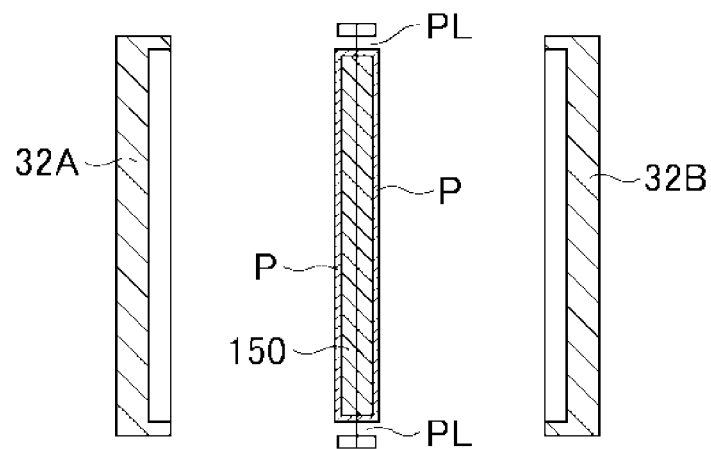
FIG. 25 is a drawing illustrating a state where the split-format molds are mold-opened in the molding operations of the sandwich panel according to the third example of the present invention.

Next, as illustrated in FIG. 25, the two split mold blocks 32 are mold-opened to separate the cavities 116 from the completed sandwich panel 10, and burrs formed around the parting line PL are removed. The molding of the sandwich panel is completed.

According to this example, each of the sheet-shaped resins is caused to have a uniform thickness in the extruding direction before the secondary molding through the adjustments of the number of rotations of the pair of rollers 30 and the driving speed of the arm drive unit 301. This ensures molding each of the sheet-shaped resins into the sheet shape having a desired thickness by the secondary molding without adversely affecting the forming in the secondary molding. Hence, when a panel sandwich that internally includes a reinforcing core material is molded by using such two strips of sheet-shaped resins as a skin material and welding peripheral edges of the sheet-shaped resins by the mold clamping, it is possible to reliably weld the peripheral edges of the sheet-shaped resins as the skin material to one another and thereby obtaining, for example, a sandwich panel that requires sufficient strength, especially, bending stiffness, such as a cargo floor board for an automobile and the like.

The examples of the present invention have been described in details. Within a range not departing from the range of the present invention, a person skilled in the art is allowed to make various kinds of changes or modifications. For example, in the above example, the description was made for the case where the generation of the draw-down or the neck-in is prevented and the thickness of the resin molded article is made uniform. However, this should not be construed in a limiting sense, and the rotation speed of the pair of rollers and the driving speed of the arm drive unit 301 may be more actively adjusted such that the thickness of the resin molded article has a desired thickness distribution in the extruding direction before the mold clamping in the secondary molding.

In the next example, the description was made for the case where the resin molded article having the hollow portion is molded using the two strips of sheet-shaped resins having identical kind and coloring of resin. However, this should not be construed in a limiting sense, and two strips of sheet-shaped resins having different kinds or colorings may be configured as a backside surface and a frontside surface for, for example, a casing of a game machine.

In the further example, the description was made for the case where the decorative material sheet is disposed between the split mold blocks and welded onto the skin material sheet by the mold clamping of the split mold blocks. However, this should not be construed in a limiting sense, and the thickness of the sheet-shaped resin may be adjusted and the decorative material sheet may be press-bonded to the sheet-shaped resin by supplying the decorative material sheet between the pair of rollers together with the sheet-shaped resin for the skin material sheet and adjusting the rotation speed of the pair of rollers and the driving speed of the arm drive unit 301.

The clamp start level may be set to a level between the split mold blocks 32 that is mold-opened in order to shorten the drawing period when, for example, the drawing speed by the clamp device 300 is set to large.

At the clamp release level, the timing where the clamping of the sheet-shaped resin is released is preferred to be after the mold clamping of the split mold blocks 32 because the state where the sheet-shaped resin is drooping from the pair of rollers 30 is unstable. However, in the case where the sheet-shaped resin is vacuum suctioned toward the cavity 116, the clamping may be released after the vacuum suction and before the mold clamping of the split mold blocks 32.

The drawing of the sheet-shaped resin by the clamp device 300 is not only for the prevention of the draw-down of the sheet-shaped resin drooping from the pair of rollers 30 as an assistance to the pair of rollers 30 sending out the sheet-shaped resin. The above-described drawing may be used to achieve a uniform thinning of the sheet-shaped resin in the extruding direction in collaboration with the pair of rollers 30 by the adjustment of the initial drawing speed of the sheet-shaped resin, the adjustment of the clamp start level and/or the clamp release level, or an adjustment of a time history of the drawing speed in a relationship with the sending out speed by the pair of rollers 30 corresponding to a physical value of the melt index or the like of the sheet-shaped resin.

Furthermore, in each of the examples, the sheet-shaped resin is obtained by extruding the thermoplastic resin in the molten state from an extrusion head in the step of extruding the sheet made of the thermoplastic resin. However, this should not be construed in a limiting sense, and a tubular-shaped parison made of the thermoplastic resin in the molten state may be divided into two sheet-shaped resins at a distal end of the extrusion head.

The invention claimed is:

1. A molding method for the resin molded article, comprising:
a step of extruding a thermoplastic resin at a predetermined extrusion speed so as to droop downward into a sheet-shape in a molten state;
a step of sandwiching a sheet-shaped resin in a molten state extruded downward by a pair of rollers, and sending out downward the sheet-shaped resin in the molten state by a rotational driving of the rollers so as to allow a first stretching;
a step of drawing downward the sheet-shaped resin in the molten state sent out so as to allow a second stretching, wherein
the step of drawing includes a step of clamping the lowest portion of the sheet-shaped resin in the molten state sent out downward by the pair of rollers and a step of drawing the lowest portion of the clamped sheet-shaped resin downward;
a step of disposing the sheet-shaped resin in the molten state that is drawn in a side portion of a mold disposed below the pair of rollers; and
a step of molding the sheet-shaped resin into a shape conforming to a mold shape by depressurizing a sealed space formed between the sheet-shaped resin in the molten state and the mold and/or pressurizing the sheet-shaped resin toward the mold.

2. The molding method for the resin molded article according to claim 1,
the step of sending out downward is a step of sending out downward the sheet-shaped resin in the molten state by the rotational driving of the rollers at a sending out speed equal to or more than the predetermined extrusion speed,
the sending out speed is a speed of the sheet-shaped resin in a molten state sent out from the pair of the rollers in the step of sending out downward,
the step of drawing downward is a step of drawing the sheet-shaped resin in the molten state sent out downward at a drawing speed equal to or more than the sending out speed,
the drawing speed is a speed of the sheet-shaped resin in a molten state in the step of drawing downward.

3. The molding method for the resin molded article according to claim 2, wherein
a relationship between a speed difference between the drawing speed and the sending out speed and a speed difference between the sending out speed and the predetermined extrusion speed are set such that an amount of thinning of the sheet-shaped resin in the molten state by the first stretching becomes larger than an amount of thinning of the sheet-shaped resin in the molten state by the second stretching in an amount of thinning of the sheet-shaped resin in the molten state that is constituted by a difference between a thickness of the sheet-shaped resin in the molten state at the step of extruding and a thickness of the sheet-shaped resin in the molten state at the step of disposing in the side portion of the mold.

4. The molding method for the resin molded article according to claim 3, wherein
the speed difference between the drawing speed and the sending out speed is set to equal to or less than the speed difference between the sending out speed and the predetermined extrusion speed.

5. The molding method for the resin molded article according to claim 2, wherein
the step of sending out includes a step of sandwiching the sheet-shaped resin by the pair of rollers, and sending out downward by the rotational driving of the rollers at a sending out speed equal to or more than the predetermined extrusion speed by relatively bringing the pair of rollers close to one another after a lowest portion of the sheet-shaped resin in the molten state extruded downward passes between the pair of rollers disposed below an extrusion slit and having an interval widened wider than a thickness of the sheet-shaped resin in the molten state immediately after an extrusion.

6. The molding method for the resin molded article according to claim 5, wherein
when the sheet-shaped resin in the molten state is stretched between the extrusion slit and the pair of rollers by the pair of rollers, a level difference between the extrusion slit and the pair of rollers is adjusted such that the sheet-shaped resin in the molten state is not torn during the stretching.

7. The molding method for the resin molded article according to claim 2, wherein
in the step of drawing, the sheet-shaped resin in the molten state is supplementarily drawn downward such that a slippage between the pair of rollers and the sheet-shaped resin in the molten state sandwiched by the pair of rollers is not generated.

8. The molding method for the resin molded article according to claim 7, wherein
the step of drawing is performed between a clamp start position of the lowest portion of the sheet-shaped resin in the molten state and a clamp release position of the lowest portion of the sheet-shaped resin in the molten state at a level lower than the clamp start position, the clamp start position being set to a level between the pair of rollers and the mold, the clamp release position being set to a level lower than the mold.

9. The molding method for the resin molded article according to claim 2, comprising
a step of adjusting an interval between the pair of rollers so as to load a constant pressing force to the sheet-shaped resin in the molten state while the pair of rollers are rotationally driven.

10. The molding method for the resin molded article according to claim 2, wherein
an initial sending out speed by the pair of rollers and/or an initial drawing speed is set in a relationship with a melt index of the sheet-shaped resin in the molten state corresponding to a difference between a thickness of the sheet-shaped resin in the molten state immediately after the extrusion and a target thickness of the sheet-shaped resin in the molten state immediately before molding by the split mold block.

11. The molding method for the resin molded article according to claim 2, wherein
an initial sending out speed by the pair of rollers is set to a maximum within a range where the sheet-shaped resin in the molten state is not torn by the first stretching, an initial drawing speed is set to a maximum within a range where the sheet-shaped resin in the molten state is not torn by the second stretching, and the drawing speed is adjusted based on the initial drawing speed such that a draw-down is not generated in the sheet-shaped resin in the molten state after being sent out by the pair of rollers until being molded by the split mold block.

12. A molding apparatus for a thermoplastic resin, comprising:
   a primary molding unit that forms the thermoplastic resin by an extrusion molding, the primary molding unit extruding the thermoplastic resin to which a primary molding is performed in a drooping form; and
   a secondary molding unit that performs a secondary molding by a blow molding or a vacuum molding to the thermoplastic resin extruded by the primary molding unit, wherein
   the primary molding unit includes:
      a melting and mixing unit that melts and mixes the thermoplastic resin,
      an accumulating unit that accumulates the melted and mixed thermoplastic resin in a predetermined amount, and
      an extrusion slit that intermittently extrudes the accumulated thermoplastic resin so as to droop in a sheet shape in the molten state,
   the secondary molding unit includes:
      a pair of split mold blocks movable in a direction approximately perpendicular to a sheet surface between an opening position and a closed position with sandwiching the drooping sheet-shaped resin, the pair of split mold blocks including cavities formed on surfaces opposing to one another, and
      a mold moving unit that moves the pair of split mold blocks in the direction approximately perpendicular to the sheet surface between the opening position and the closed position, wherein
   the molding apparatus further includes:
      a pair of rollers positioned at a predetermined position below the extrusion slit and above the pair of split mold blocks, the pair of rollers including respective rotation axes disposed in parallel with one another and approximately horizontally, one being a rotationally driving roller, another being a driven roller,
      a roller rotationally driving unit that rotationally drives the rotationally driving roller,
      a roller moving unit that moves any one of the rollers among the pair of rollers with respect to the corresponding roller or moves both the rollers within a planar surface encompassing the pair of rollers, and
      a relative speed difference adjustment unit that adjusts a relative speed difference between an extrusion speed of the extruded sheet made of the thermoplastic resin in the molten state and a downward sending out speed by the pair of rollers of the sheet made of the thermoplastic resin sandwiched between the pair of rollers, wherein
   the molding apparatus further includes:
      a sheet-shaped resin drawing unit that includes:
      a clamp portion that is configured to clamp a lowest portion of the sheet-shaped resin sent out downward by the pair of rollers,
      a clamp portion moving unit that moves the clamp portion in a vertical direction, and
      a clamp portion moving speed adjustment unit that adjusts a moving speed of the clamp portion in the vertical direction by the clamp portion moving unit corresponding to the sending out speed of the sheet-shaped thermoplastic resin by the pair of rollers in a state where the lowest portion of the sheet-shaped thermoplastic resin is clamped by the clamp portion, wherein the clamp portion moving unit is configured to move the clamp portion between a clamp start position where clamping of the lowest portion of the sheet-shaped thermoplastic resin is started by the clamp portion and a clamp release position below the clamp start position and where clamping of the lowest portion of the sheet-shaped thermoplastic resin is released by the clamp portion, and the clamp release position is at a level lower than the pair of split mold blocks.

13. The molding apparatus for the thermoplastic resin according to claim 12, wherein:
   the relative speed difference adjustment unit includes a roller rotation speed adjustment unit that adjusts a rotation speed of the rotationally driving roller in a range where the sending out speed is equal to or more than the extrusion speed corresponding to the extrusion speed of the sheet made of the thermoplastic resin in a state where the sheet made of the thermoplastic resin is sandwiched between the pair of rollers, and
   the clamp portion moving speed adjustment unit adjusts a moving speed of the clamp portion in a range where the drawing speed of the sheet-shaped resin by the clamp portion moving speed adjustment unit is equal to or more than the sending out speed corresponding to the sending out speed of the sheet made of the thermoplastic resin by the pair of rollers.

* * * * *